(12) United States Patent
Tian et al.

(10) Patent No.: US 12,101,244 B1
(45) Date of Patent: Sep. 24, 2024

(54) LAYER 7 NETWORK SECURITY FOR CONTAINER WORKLOADS

(71) Applicant: VMware LLC, Palo Alto, CA (US)

(72) Inventors: Quan Tian, Beijing (CN); Jianjun Shen, Redwood City, CA (US); Yang Ding, Fremont, CA (US); Donghai Han, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/222,399

(22) Filed: Jul. 14, 2023

(30) Foreign Application Priority Data

Jun. 12, 2023 (WO) ................ PCT/CN2023/099675

(51) Int. Cl.
*H04L 45/24* (2022.01)
*H04L 45/00* (2022.01)
*H04L 69/329* (2022.01)

(52) U.S. Cl.
CPC ............ *H04L 45/22* (2013.01); *H04L 69/329* (2013.01)

(58) Field of Classification Search
CPC ....... H04L 45/22; H04L 45/24; H04L 45/243; H04L 45/247; H04L 45/30; H04L 69/329; H04L 69/40
USPC .................. 709/203, 206, 220, 224, 225–228
See application file for complete search history.

(56) References Cited

U.S. PATENT DOCUMENTS

| | | |
|---|---|---|
| 6,697,360 B1 | 2/2004 | Gai et al. |
| 6,765,914 B1 | 7/2004 | Jain et al. |
| 7,869,439 B1 | 1/2011 | Ramberg et al. |
| 7,890,543 B2 | 2/2011 | Hunt et al. |
| 7,912,955 B1 | 3/2011 | Machiraju et al. |
| 8,627,442 B2 | 1/2014 | Ji et al. |

(Continued)

FOREIGN PATENT DOCUMENTS

| | | | |
|---|---|---|---|
| AU | 2004227600 B2 | 5/2009 | |
| AU | 2019410233 A1 * | 7/2021 | ............. H04L 45/04 |

(Continued)

OTHER PUBLICATIONS

Abhashkumar, Anubhavnidhi, et al., "Supporting Diverse Dynamic Intent-based Policies Using Janus," CoNEXT 17, Dec. 12-15, 2017, 14 pages, ACM, Incheon, KR.

(Continued)

*Primary Examiner* — Khanh Q Dinh
(74) *Attorney, Agent, or Firm* — Quarles & Brady LLP

(57) ABSTRACT

Some embodiments of the invention provide a method of performing layer 7 (L7) packet processing for a set of Pods executing on a host computer, the set of Pods managed by a container orchestration platform. The method is performed at the host computer. The method receives notification of a creation of a traffic control (TC) custom resource (CR) that is defined by reference to a TC custom resource definition (CRD). The method identifies a set of interfaces of a set of one or more managed forwarding elements (MFEs) executing on the host computer that are candidate interfaces for receiving flows that need to be directed based on the TC CR to a layer 7 packet processor. Based on the identified set of interfaces, the method provides a set of flow records to the set of MFEs to process in order to direct a subset of flows that the set of MFEs receive to the layer 7 packet processor.

20 Claims, 8 Drawing Sheets

(56) References Cited

U.S. PATENT DOCUMENTS

| | | |
|---|---|---|
| 8,683,560 B1 | 3/2014 | Brooker et al. |
| 9,152,803 B2 | 10/2015 | Biswas et al. |
| 9,225,638 B2 | 12/2015 | Jain et al. |
| 9,258,312 B1 | 2/2016 | O'Neill et al. |
| 9,531,590 B2 | 12/2016 | Jain et al. |
| 9,536,077 B2 | 1/2017 | Bignon et al. |
| 9,590,901 B2 | 3/2017 | Tubaltsev et al. |
| 9,594,546 B1 | 3/2017 | Todd et al. |
| 9,674,275 B1 | 6/2017 | Engers et al. |
| 9,755,898 B2 | 9/2017 | Jain et al. |
| 9,774,537 B2 | 9/2017 | Jain et al. |
| 9,813,509 B1 | 11/2017 | Visser et al. |
| 9,825,810 B2 | 11/2017 | Jain et al. |
| 9,935,827 B2 | 4/2018 | Jain et al. |
| 9,979,641 B2 | 5/2018 | Jain et al. |
| 10,095,669 B1 | 10/2018 | Karppanen |
| 10,122,735 B1 | 11/2018 | Wohlgemuth |
| 10,129,077 B2 | 11/2018 | Jain et al. |
| 10,135,737 B2 | 11/2018 | Jain et al. |
| 10,193,977 B2 | 1/2019 | Ke et al. |
| 10,205,701 B1 | 2/2019 | Voss et al. |
| 10,225,137 B2 | 3/2019 | Jain et al. |
| 10,257,095 B2 | 4/2019 | Jain et al. |
| 10,270,796 B1 | 4/2019 | Veeraswamy et al. |
| 10,320,679 B2 | 6/2019 | Jain et al. |
| 10,341,233 B2 | 7/2019 | Jain et al. |
| 10,496,605 B2 | 12/2019 | Melnik et al. |
| 10,516,568 B2 | 12/2019 | Jain et al. |
| 10,547,521 B1 | 1/2020 | Roy et al. |
| 10,594,743 B2 | 3/2020 | Hong et al. |
| 10,609,091 B2 | 3/2020 | Hong et al. |
| 10,613,888 B1 | 4/2020 | Mentz et al. |
| 10,628,144 B2 | 4/2020 | Myneni et al. |
| 10,652,143 B2 | 5/2020 | Ravinoothala et al. |
| 10,693,782 B2 | 6/2020 | Jain et al. |
| 10,708,368 B1 | 7/2020 | Young et al. |
| 10,725,836 B2 | 7/2020 | Savenkov et al. |
| 10,795,909 B1 | 10/2020 | Bond et al. |
| 10,812,337 B2 | 10/2020 | Vaidya et al. |
| 10,841,226 B2 | 11/2020 | Mariappan et al. |
| 10,860,444 B2 | 12/2020 | Natanzon |
| 10,942,788 B2 | 3/2021 | Palavalli et al. |
| 10,944,691 B1 | 3/2021 | Raut et al. |
| 10,951,661 B1 | 3/2021 | Medan et al. |
| 10,972,341 B2 | 4/2021 | Mudigonda |
| 10,972,386 B2 | 4/2021 | Mackie et al. |
| 11,038,953 B1 * | 6/2021 | Nayak ............... H04L 45/70 |
| 11,074,091 B1 | 7/2021 | Nayakbomman et al. |
| 11,086,700 B2 | 8/2021 | Myneni et al. |
| 11,159,366 B1 | 10/2021 | Gawade et al. |
| 11,190,491 B1 | 11/2021 | Kaciulis et al. |
| 11,194,483 B1 | 12/2021 | Dontu et al. |
| 11,228,957 B2 * | 1/2022 | Gunnalan ............ H04W 36/30 |
| 11,277,309 B2 | 3/2022 | Vaidya et al. |
| 11,283,720 B1 * | 3/2022 | Long ..................... H04L 69/22 |
| 11,290,374 B2 * | 3/2022 | Rochwerger ........ H04L 47/2475 |
| 11,316,822 B1 | 4/2022 | Gawade et al. |
| 11,436,057 B2 | 9/2022 | Shen et al. |
| 11,500,688 B2 | 11/2022 | Liu et al. |
| 11,570,146 B2 | 1/2023 | Liu et al. |
| 11,606,254 B2 | 3/2023 | Liu et al. |
| 11,671,400 B2 | 6/2023 | Zhou et al. |
| 11,671,401 B2 | 6/2023 | Singh et al. |
| 11,689,425 B2 | 6/2023 | Vaidya et al. |
| 11,689,497 B2 | 6/2023 | Shen et al. |
| 11,748,170 B2 | 9/2023 | Palavalli et al. |
| 2004/0098154 A1 | 5/2004 | McCarthy |
| 2005/0129019 A1 | 6/2005 | Cheriton |
| 2006/0221358 A1 * | 10/2006 | Takahashi ........... H04N 1/00472 |
| | | 358/1.1 |
| 2007/0244962 A1 | 10/2007 | Laadan et al. |
| 2007/0245334 A1 | 10/2007 | Nieh et al. |
| 2007/0251998 A1 | 11/2007 | Belenki |
| 2010/0149996 A1 | 6/2010 | Sun |
| 2010/0177674 A1 | 7/2010 | Aggarwal |
| 2010/0211815 A1 | 8/2010 | Mankovskii et al. |
| 2010/0246545 A1 | 9/2010 | Berzin |
| 2010/0293378 A1 | 11/2010 | Xiao et al. |
| 2011/0161988 A1 | 6/2011 | Kashyap |
| 2011/0194494 A1 | 8/2011 | Aso et al. |
| 2011/0282936 A1 | 11/2011 | Chekhanovskiy et al. |
| 2011/0289508 A1 | 11/2011 | Fell et al. |
| 2012/0117226 A1 | 5/2012 | Tanaka et al. |
| 2012/0150912 A1 | 6/2012 | Ripberger |
| 2012/0304275 A1 | 11/2012 | Ji et al. |
| 2013/0018994 A1 | 1/2013 | Flavel et al. |
| 2013/0019314 A1 | 1/2013 | Ji et al. |
| 2013/0125230 A1 | 5/2013 | Koponen et al. |
| 2013/0174168 A1 | 7/2013 | Abuelsaad et al. |
| 2013/0266019 A1 | 10/2013 | Qu et al. |
| 2013/0283339 A1 | 10/2013 | Biswas et al. |
| 2013/0336329 A1 * | 12/2013 | Gopinath ............... H04L 47/125 |
| | | 370/401 |
| 2014/0036730 A1 | 2/2014 | Nellikar et al. |
| 2014/0056298 A1 | 2/2014 | Vobbilisetty et al. |
| 2014/0129690 A1 | 5/2014 | Jaisinghani et al. |
| 2014/0133302 A1 * | 5/2014 | Fu ........................ H04L 45/121 |
| | | 370/231 |
| 2014/0164897 A1 | 6/2014 | Yucel et al. |
| 2014/0223556 A1 | 8/2014 | Bignon et al. |
| 2014/0237100 A1 | 8/2014 | Cohn et al. |
| 2014/0258479 A1 | 9/2014 | Tenginakai et al. |
| 2014/0269332 A1 * | 9/2014 | Senarath ................. H04L 45/38 |
| | | 370/238 |
| 2015/0029864 A1 * | 1/2015 | Raileanu ............ H04L 43/0888 |
| | | 370/237 |
| 2015/0063166 A1 | 3/2015 | Sif et al. |
| 2015/0081767 A1 | 3/2015 | Evens |
| 2015/0100704 A1 | 4/2015 | Davie et al. |
| 2015/0172093 A1 | 6/2015 | Kaneko et al. |
| 2015/0222598 A1 | 8/2015 | Koponen et al. |
| 2015/0249574 A1 | 9/2015 | Zhang |
| 2015/0263899 A1 | 9/2015 | Tubaltsev et al. |
| 2015/0263946 A1 | 9/2015 | Tubaltsev et al. |
| 2015/0317169 A1 | 11/2015 | Sinha et al. |
| 2015/0348044 A1 | 12/2015 | Smith |
| 2015/0379281 A1 | 12/2015 | Feroz et al. |
| 2016/0036860 A1 | 2/2016 | Xing et al. |
| 2016/0080422 A1 | 3/2016 | Belgodere et al. |
| 2016/0094454 A1 | 3/2016 | Jain et al. |
| 2016/0094457 A1 | 3/2016 | Jain et al. |
| 2016/0094650 A1 | 3/2016 | Rio |
| 2016/0094661 A1 | 3/2016 | Jain et al. |
| 2016/0182293 A1 | 6/2016 | Benedetto et al. |
| 2016/0217301 A1 | 7/2016 | Watanabe et al. |
| 2016/0239326 A1 | 8/2016 | Kaplan et al. |
| 2016/0241436 A1 | 8/2016 | Fourie et al. |
| 2016/0254964 A1 | 9/2016 | Benc |
| 2016/0269318 A1 | 9/2016 | Su et al. |
| 2016/0294612 A1 | 10/2016 | Ravinoothala et al. |
| 2016/0315809 A1 | 10/2016 | McMurry et al. |
| 2016/0335129 A1 | 11/2016 | Behera et al. |
| 2016/0337334 A1 | 11/2016 | Murr |
| 2017/0005923 A1 | 1/2017 | Babakian |
| 2017/0005986 A1 | 1/2017 | Bansal et al. |
| 2017/0031956 A1 | 2/2017 | Burk et al. |
| 2017/0063632 A1 | 3/2017 | Goliya et al. |
| 2017/0063782 A1 | 3/2017 | Jain et al. |
| 2017/0085561 A1 | 3/2017 | Han et al. |
| 2017/0093790 A1 | 3/2017 | Banerjee et al. |
| 2017/0171144 A1 | 6/2017 | Sagiraju et al. |
| 2017/0177394 A1 | 6/2017 | Barzik et al. |
| 2017/0195210 A1 | 7/2017 | Jacob et al. |
| 2017/0206034 A1 | 7/2017 | Fetik |
| 2017/0207963 A1 | 7/2017 | Mehta et al. |
| 2017/0286698 A1 | 10/2017 | Shetty et al. |
| 2017/0317954 A1 | 11/2017 | Masurekar et al. |
| 2017/0324781 A1 | 11/2017 | Hu et al. |
| 2017/0332307 A1 | 11/2017 | Pan |
| 2017/0353351 A1 | 12/2017 | Cheng et al. |
| 2017/0366416 A1 | 12/2017 | Beecham et al. |
| 2017/0374106 A1 | 12/2017 | Hamou et al. |
| 2018/0019969 A1 | 1/2018 | Murthy |
| 2018/0063194 A1 | 3/2018 | Vaidya et al. |

(56) References Cited

U.S. PATENT DOCUMENTS

| | | |
|---|---|---|
| 2018/0083835 A1 | 3/2018 | Cole et al. |
| 2018/0089299 A1 | 3/2018 | Collins et al. |
| 2018/0114012 A1 | 4/2018 | Sood et al. |
| 2018/0123943 A1 | 5/2018 | Lee et al. |
| 2018/0131675 A1 | 5/2018 | Sengupta et al. |
| 2018/0167453 A1 | 6/2018 | Luo |
| 2018/0167458 A1 | 6/2018 | Ould-Brahim et al. |
| 2018/0167487 A1 | 6/2018 | Vyas et al. |
| 2018/0183757 A1 | 6/2018 | Gunda et al. |
| 2018/0205605 A1 | 7/2018 | Mittal et al. |
| 2018/0234459 A1 | 8/2018 | Kung et al. |
| 2018/0248827 A1 | 8/2018 | Scharber et al. |
| 2018/0262424 A1 | 9/2018 | Roeland et al. |
| 2018/0287944 A1* | 10/2018 | Raileanu ............ H04L 43/16 |
| 2018/0287996 A1 | 10/2018 | Tripathy et al. |
| 2018/0295036 A1 | 10/2018 | Krishnamurthy et al. |
| 2018/0331885 A1 | 11/2018 | Raymond et al. |
| 2018/0359323 A1 | 12/2018 | Madden |
| 2019/0034237 A1 | 1/2019 | Siddappa et al. |
| 2019/0036868 A1 | 1/2019 | Chandrashekhar et al. |
| 2019/0042518 A1 | 2/2019 | Marolia et al. |
| 2019/0068500 A1 | 2/2019 | Hira |
| 2019/0068544 A1 | 2/2019 | Hao et al. |
| 2019/0079751 A1 | 3/2019 | Foskett et al. |
| 2019/0097879 A1 | 3/2019 | Cai et al. |
| 2019/0102280 A1 | 4/2019 | Caldato et al. |
| 2019/0103992 A1 | 4/2019 | Cidon et al. |
| 2019/0132220 A1 | 5/2019 | Boutros et al. |
| 2019/0132221 A1 | 5/2019 | Boutros et al. |
| 2019/0132283 A1 | 5/2019 | Ballard et al. |
| 2019/0140895 A1 | 5/2019 | Ennis, Jr. et al. |
| 2019/0140921 A1 | 5/2019 | Xu et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0173780 A1 | 6/2019 | Hira et al. |
| 2019/0213004 A1 | 7/2019 | Zhu et al. |
| 2019/0229987 A1 | 7/2019 | Shelke et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0245757 A1 | 8/2019 | Meyer et al. |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0065080 A1 | 2/2020 | Myneni et al. |
| 2020/0065166 A1 | 2/2020 | Myneni et al. |
| 2020/0073692 A1 | 3/2020 | Rao et al. |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0084112 A1 | 3/2020 | Kandaswamy et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0252376 A1 | 8/2020 | Feng et al. |
| 2020/0301801 A1 | 9/2020 | Hegde |
| 2020/0314006 A1 | 10/2020 | Mackie et al. |
| 2020/0314173 A1 | 10/2020 | Pahwa et al. |
| 2020/0344120 A1 | 10/2020 | Pianigiani et al. |
| 2020/0344168 A1* | 10/2020 | Raileanu ............ H04L 47/122 |
| 2020/0366558 A1 | 11/2020 | Vaidya et al. |
| 2020/0374186 A1 | 11/2020 | Scott |
| 2020/0379812 A1 | 12/2020 | Ranjan et al. |
| 2020/0382556 A1 | 12/2020 | Woolward et al. |
| 2020/0401457 A1 | 12/2020 | Singhal et al. |
| 2020/0403853 A1 | 12/2020 | Garipally et al. |
| 2020/0403860 A1 | 12/2020 | Lewis et al. |
| 2020/0409671 A1 | 12/2020 | Mazurskiy |
| 2021/0004292 A1 | 1/2021 | Zlotnick et al. |
| 2021/0064442 A1 | 3/2021 | Alluboyina et al. |
| 2021/0099335 A1 | 4/2021 | Li |
| 2021/0165695 A1 | 6/2021 | Palavalli et al. |
| 2021/0200814 A1 | 7/2021 | Tal et al. |
| 2021/0211514 A1* | 7/2021 | Box ............... H04L 43/062 |
| 2021/0218652 A1 | 7/2021 | Raut et al. |
| 2021/0243164 A1 | 8/2021 | Murray et al. |
| 2021/0273946 A1 | 9/2021 | Iqbal et al. |
| 2021/0306285 A1 | 9/2021 | Hirasawa et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314300 A1 | 10/2021 | Shen et al. |
| 2021/0314361 A1 | 10/2021 | Zhou et al. |
| 2021/0314388 A1 | 10/2021 | Zhou et al. |
| 2021/0328858 A1 | 10/2021 | Asveren et al. |
| 2021/0349765 A1 | 11/2021 | Zhou et al. |
| 2021/0352044 A1 | 11/2021 | Asveren et al. |
| 2021/0365308 A1 | 11/2021 | Myneni et al. |
| 2021/0397466 A1 | 12/2021 | McKee et al. |
| 2021/0409336 A1 | 12/2021 | Talur et al. |
| 2022/0012045 A1 | 1/2022 | Rudraraju et al. |
| 2022/0035651 A1 | 2/2022 | Maurya et al. |
| 2022/0038311 A1 | 2/2022 | Shen et al. |
| 2022/0070250 A1 | 3/2022 | Baid et al. |
| 2022/0091868 A1 | 3/2022 | Malleni et al. |
| 2022/0158926 A1 | 5/2022 | Wennerström et al. |
| 2022/0182439 A1 | 6/2022 | Zhou et al. |
| 2022/0200865 A1 | 6/2022 | Vaidya et al. |
| 2022/0210113 A1 | 6/2022 | Pillareddy et al. |
| 2022/0278926 A1 | 9/2022 | Sharma et al. |
| 2022/0303246 A1 | 9/2022 | Miriyala et al. |
| 2022/0311738 A1 | 9/2022 | Singh et al. |
| 2022/0321495 A1 | 10/2022 | Liu et al. |
| 2022/0400053 A1 | 12/2022 | Liu et al. |
| 2023/0043362 A1 | 2/2023 | Kita et al. |
| 2023/0070224 A1 | 3/2023 | Huo et al. |
| 2023/0104568 A1 | 4/2023 | Miriyala et al. |
| 2023/0179484 A1 | 6/2023 | Liu et al. |
| 2023/0179573 A1 | 6/2023 | Sosnovich et al. |
| 2023/0231741 A1 | 7/2023 | Tang et al. |
| 2023/0231827 A1 | 7/2023 | Tang et al. |
| 2023/0244591 A1 | 8/2023 | Sun et al. |

FOREIGN PATENT DOCUMENTS

| | | | |
|---|---|---|---|
| CA | 3107455 A1 | 2/2020 | |
| CN | 105897946 A | 8/2016 | |
| CN | 106789367 A | 5/2017 | |
| CN | 107947961 A | 4/2018 | |
| CN | 108809722 A | 11/2018 | |
| CN | 110531987 A | 12/2019 | |
| CN | 110611588 A | 12/2019 | |
| CN | 111327640 A | 6/2020 | |
| CN | 111371627 A | 7/2020 | |
| CN | 111865643 A | 10/2020 | |
| CN | 113141386 A | 7/2021 | |
| EP | 1542398 A1 * | 6/2005 | ......... H04L 41/5009 |
| EP | 2464151 A2 | 6/2012 | |
| EP | 2464152 A2 | 6/2012 | |
| EP | 2830270 A1 | 1/2015 | |
| EP | 3316532 A1 | 5/2018 | |
| EP | 3617879 A1 | 3/2020 | |
| JP | 2011070707 A | 4/2011 | |
| JP | 2012099048 A | 5/2012 | |
| JP | 2014535213 A | 12/2014 | |
| JP | 2015115043 A | 6/2015 | |
| JP | 2018523932 A | 8/2018 | |
| WO | 2011159842 A2 | 12/2011 | |
| WO | 2013063330 A1 | 5/2013 | |
| WO | 2016160523 A1 | 10/2016 | |
| WO | 2018044341 A1 | 3/2018 | |
| WO | 2018044352 A1 | 3/2018 | |
| WO | 2019241086 A1 | 12/2019 | |
| WO | 2020041073 A1 | 2/2020 | |
| WO | 2020041074 A1 | 2/2020 | |

(56) References Cited

FOREIGN PATENT DOCUMENTS

| WO | 2021196080 A1 | 10/2021 |
|---|---|---|
| WO | 2022026028 A1 | 2/2022 |
| WO | 2022204941 A9 | 10/2022 |
| WO | 2023133797 A1 | 7/2023 |

OTHER PUBLICATIONS

Abwnawar, Nasser, "A Policy-Based Management Approach to Security in Cloud Systems," Feb. 2020, 184 pages, De Monfort University, Leicester, UK.

Author Unknown, "Advanced Networking Features in Kubernetes and Container Bare Metal," Document 606835-001, Dec. 2018, 42 pages, Intel Corporation.

Author Unknown, "Assign Memory Resources to Containers and Pods," Oct. 17, 2020, 7 pages.

Author Unknown, "Chapter 4: Default Security Policy," IBM Security Access Manager Version 9.0, Oct. 2015, 18 pages.

Author Unknown, "Containers and Container Networking for Network Engineers: VMware NSX Container Networking," Jan. 2018, 58 pages, VMware, Inc.

Author Unknown, "E-Security Begins with Sound Security Policies," Jun. 14, 2001, 23 pages, Symantec Corporation.

Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.

Author Unknown, "NSX and Micro-segmentation," Jan. 3, 2017, 2 pages, retrieved from https://www.youtube.com/watch?v=I_QtISXaxkE.

Author Unknown, "NSX Policy API: Getting Started Guide," Technical White Paper, Sep. 2019, 28 pages, VMware, Inc.

Author Unknown, "NSX vSphere API Guide—NSX 6.2 for vSphere," Jan. 6, 2017, 400 pages, VMware, Inc.

Author Unknown, "OpenShift Container Platform 4.6," Mar. 3, 2021, 41 pages, Red Hat, Inc.

Author Unknown, "VMware NSX for vSphere 6.4—Application Rule Manager Enhancements," Jan. 20, 2018, 2 pages, retrieved from https://www.youtube.com/watch?v=r3IKNkt5mi8.

Author Unknown, "VMware NSX-T 2.4: Advancing NSX Everywhere for Everyone," Feb. 27, 2019, 2 pages, retrieved from https://www.youtube.com/watch?v=lqPyRBWABHg.

Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.

Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

Non-published Commonly Owned U.S. Appl. No. 17/724,433, filed Apr. 19, 2022, 51 pages, VMware, Inc.

Non-published Commonly Owned U.S. Appl. No. 17/724,436, filed Apr. 19, 2022, 51 pages, VMware, Inc.

Non-Published Commonly Owned U.S. Appl. No. 17/960,126, filed Oct. 4, 2022, 28 pages, VMware, Inc.

Non-Published Commonly Owned U.S. Appl. No. 18/098,071, filed Jan. 17, 2023, 88 pages, VMware, Inc.

Non-Published Commonly Owned U.S. Appl. No. 18/098,072, filed Jan. 17, 2023, 87 pages, VMware, Inc.

Non-Published Commonly Owned U.S. Appl. No. 18/098,076, filed Jan. 17, 2023, 88 pages, VMware, Inc.

Non-Published Commonly Owned U.S. Appl. No. 18/098,078, filed Jan. 17, 2023, 87 pages, VMware, Inc.

Non-Published Commonly Owned U.S. Appl. No. 18/098,081, filed Jan. 17, 2023, 52 pages, VMware, Inc.

Non-Published Commonly Owned U.S. Appl. No. 18/211,360, filed Jun. 19, 2023, 41 pages, VMware, Inc.

Non-Published Commonly Owned U.S. Appl. No. 18/227,306, filed Jul. 28, 2023, 37 pages, VMware, Inc.

Patni, Sanjay, "Pro RESTful APIs," Month Unknown 2017, 136 pages, Apress, New York City, NY, USA.

Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.

Rouse, Margaret, "What is SDDC (software-defined data center)?—Definition from WhatIs.com," Mar. 2017, 5 pages, TechTarget.com.

Sayfan, Gigi, "Mastering Kubernetes: Automating container deployment and management," May 2017, 426 pages, Packt Publishing, Birmingham, UK.

Wodicka, Brent, "A Developer's Guide to Container Orchestration, Kubernetes, & AKS," Mar. 19, 2019, 5 pages, AIS, Reston, VA, USA.

\* cited by examiner

```
type TrafficControl struct {
  metav1.TypeMeta
  metav1.ObjectMeta
  // Specification of the desired behavior of TrafficControl.
  Spec TrafficControlSpec
} type TrafficControlSpec struct {
  // Default to the empty LabelSelector, which matches everything.
  // +optional
  NamespaceSelector *metav1.LabelSelector
  // Default to the empty LabelSelector, which matches everything.
  // +optional
  PodSelector *metav1.LabelSelector
  // The direction of traffic that should be matched. It can be In, Out, or Both.
  Direction Direction
  // The action that should be take for the traffic. It can be Redirect or Mirror.
  Action Action
  // The target device that the traffic should be redirected or mirrored to.
  Device string
}
```

```
apiVersion: crd.antrea.io/v1alpha1
kind: TrafficControl
metadata:
  name: web-app-firewall-redirection
spec:
  podSelector:
    matchLabels:
      app: web
    namespaceSelector: {}
    direction: In
    action: Redirect
    device: firewall0
```

```
table=TrafficControl, ct_state=+new+trk,ip,
actset_output="veth-a" actions=load:0x1->NXM_NX_REG2[0]
table=TrafficControl, ct_state=+new+trk,ip,
actset_output="veth-b" actions=load:0x1->NXM_NX_REG2[0]
table=ConntrackCommit, reg2=0x1/0x1
actions=ct(commit,table=HairpinSNAT,zone=65520,exec(load:0x24-
>NXM_NX_CT_MARK[]))
table=Output, ct_state=+trk,ct_mark=0x24
actions=output:"firewall0"
```

*Figure 5*

Inter-Node Traffic with Both Ingress and Egress L7 Policy

LAYER 7 NETWORK SECURITY FOR CONTAINER WORKLOADS

BACKGROUND

In today's container networks (e.g., Kubernetes), network policies (e.g., Kubernetes Network Policies) are used to control traffic flow at Layer 3 (Network) and Layer 4 (Transport) in the OSI model, based on IP address, transport protocol, and port. Many cloud native applications use application layer protocols such as HTTP or gRPC to communicate and expose APIs. Securing such applications at the IP and port level provides very limited security as the APIs are either entirely exposed to a client or not exposed at all. Some solutions in the cloud native ecosystem provide the capability to filter on specific application protocol attributes, and achieve it by extending filters of the Envoy proxy, which introduces extra costs and cannot be extended to support more advanced network security features like protocol detection, Intrusion Detection (IDS) and Intrusion Prevention (IPS).

BRIEF SUMMARY

Some embodiments of the invention provide a method of performing layer 7 (L7) packet processing for a set of Pods that execute on a host computer. The Pods are managed by a container orchestration platform in some embodiments. Also, in some embodiments, the method is performed by a module executing on the host computer. For instance, in some embodiments, the method is performed by a network plugin agent deployed to the host computer.

The method initially receives notification regarding the creation of a traffic control (TC) custom resource (CR) instance that is defined by reference to a TC custom resource definition (CRD). The traffic control CR uses one or more high-level attributes that define a category of data traffic flows that should be directed to a set of one or more L7 packet processor. The method receives the notification from the container orchestration platform in some embodiments. For example, the notification in some embodiments is received from an API server of the container orchestration platform. This API server receives an API (application programming interface) that directs the API server to create the TC CR, and creates the TC CR instance by parsing the API to extract parameters used to define the TC CR.

After receiving the notification regarding the creation of the TC CR, the method then uses the TC CR attributes to generate a set of flow records for a set of one or more managed forwarding elements (MFEs) executing on the host computer to use to direct a set of flows received by the MFE set to the layer 7 packet processor. After generating the set of flow records, the method provides the set of flow records to the set of MFEs to use. For instance, in some embodiments, the set of MFEs includes an OVS (Open Virtual Switch) forwarding element executing on the host computer. In these embodiments, the method provides one or more OVS flow records for the OVS forwarding element to use to identify flows that need to be directed or re-directed to the L7 packet processor (e.g., an L7 firewall).

To generate the flow records, the method in some embodiments identifies a set of interfaces of the MFE set executing on the host computer that are candidate interfaces for receiving flows that need to be directed based on the TC CR instance to a layer 7 packet processor. The identified set of interfaces in some embodiments can include (1) an interface associated with a Pod that executes on the host computer and that is a source of a flow that needs to be directed to the L7 packet processor, and/or (2) an interface associated with a Pod that is a destination of a flow that needs to be directed to the L7 packet processor.

The TC CR instance includes one or more attributes that the method uses to identify source or destination Pods. These might be attributes that specifically identify these Pods, or might be high-level attributes that identify the Pods more generally. For instance, these attributes in some embodiments include labels associated with Pods, or labels associated with namespaces. These attributes can also specify a direction of flows of interest (e.g., in, out, or both). In some embodiments, whether a Pod is a source or destination of a flow is determined based on whether the TC CR instance is specified for ingress flows to the Pod (i.e., direction specified is "in"), egress flows from the Pod (i.e., direction specified is "out"), or both ingress and egress flows associated with the Pod (i.e., direction specified is "both"). The source or destination Pods, in some embodiments, are defined in the TC CR instance using high level attributes, while the set of flow records specifies interfaces of the source or destination Pods in terms of network addresses associated with the source or destination Pods (i.e., lower-level attributes).

In addition to identifying the set of interfaces connected to the source or destination machines (e.g., Pods), the method in some embodiments also identifies the MFE interface associated with the L7 packet processor. For instance, in some embodiments, the TC CR instance has a set of one or more identifier attributes (e.g., name or label attribute) that the method uses to identify the L7 packet processor to use, and the method uses the identifier attribute set to identify an MFE interface associated with the L7 packet processor. The method in some embodiments uses the identified MFE interface associated with the L7 packet processor to define the flow record(s) that it generates for directing or re-directing a set of flows to the L7 packet processor. For instance, some embodiments use an IP (Internet protocol) address assigned to the identified MFE interface for the L7 packet processor as the IP address to which packets matching a flow record in the set of flow records are to be directed. In some embodiments, the L7 packet processor executes on the host computer, while in other embodiments, the L7 packet processor executes outside of the host computer.

In some embodiments, the L7 packet processor performs one or more middlebox service operations based on L7 parameters extracted from flows directed to and processed by the L7 packet processor. The L7 parameters are extracted by the L7 packet processor of some embodiments during a deep packet inspection (DPI) operation performed on the flows by the L7 packet processor. Examples of middlebox service operations include firewall operations, load balancing operations, network address translation operations, intrusion detection operations, and intrusion prevention operations, in some embodiments.

In some embodiments, the flow record that the method generates for and provides to the MFE has an action attribute that specifies how the MFE should forward a flow to the L7 packet processor. The method generates this action attribute based on an action attribute that is specified in the TC CR instance in some embodiments. Examples of such actions include (1) "redirect" which directs the MFE to forward a particular flow to the L7 packet processor, and (2) "copy" or "mirror" which directs the MFE to forward a copy of a flow to the L7 packet processor. When a flow's packet is redirected to the L7 packet processor, the MFE would receive the packet again from the L7 packet processor (assuming that the packet is not dropped), and then forward the packet to the destination specified by the packet's source (e.g., the source Pod).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 3 illustrates an example of the structure of a traffic control CRD of some embodiments.

FIG. 4 illustrates an example of a CR generated based on a CRD of some embodiments.

FIG. 5 illustrates an example of calculated OpenFlow rules of some embodiments for first and second Pods having respective OVS ports.

DETAILED DESCRIPTION

Figure 1:
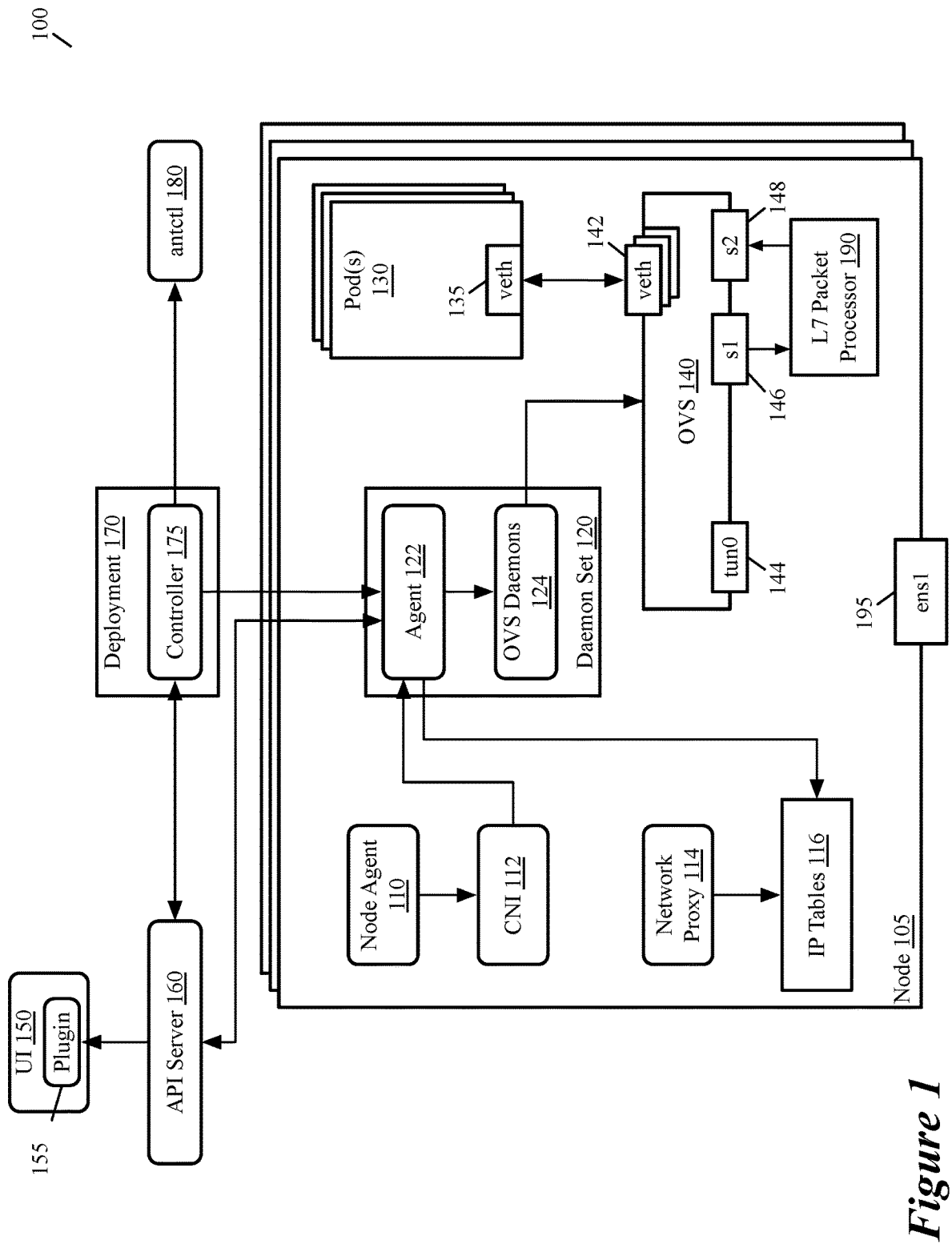
FIG. 1 illustrates a networking solution for a container orchestration network of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method of performing layer 7 (L7) packet processing for a set of Pods that execute on a host computer. The Pods are managed by a container orchestration platform in some embodiments. Container orchestration platforms of some embodiments are central platforms for managing the lifecycle of containers, as well as providing a network so that the containers can communicate. In some embodiments, container orchestration platforms provide an automated solution for running the containerized workloads and services, such as provisioning, deploying, scaling (e.g., scaling up or down), networking, and load balancing. Container orchestration platforms allow for simplification of large amounts of complex operations introduced by containers, resilience in the form of container orchestration tools that automatically restart or scale a container or cluster, and additional security by reducing or eliminating human error through automation.

Containers are lightweight, ephemeral software packages that include everything required to run an application (e.g., application code and everything needed for the code to run properly), while being decoupled from the underlying operating system (OS) and infrastructure on which they run. As a result, containers are highly portable, speed up application development and deployment, and consume fewer resources. In some embodiments, one or more containers are grouped into Pods, in which storage and network resources, as well as a specification for how to run the containers, are shared. The contents of a Pod are co-located, co-scheduled, and run in a shared context.

Kubernetes is an example of an open-source container orchestration platform utilized in some embodiments. Microservices of some embodiments can be modelled as Kubernetes Services over deployments of Pods, which specifies how to expose and scale a fleet of containers created for the services of some embodiments. However, because Kubernetes does not provide a default implementation for networking among its workloads, the networking implementation is delegated to a CNI (Container Network Interface) plugin. The CNI plugin implements standard CNI API (application programming interface) set forth by Kubernetes, and configures networking for each Pod created in a Kubernetes cluster (e.g., a set of nodes that run containerized applications). In some embodiments, CNIs can also choose to implement Kubernetes NetworkPolicy, which is a declarative way of specifying Layer 3 (Network) and Layer 4 (Transport) networking security posture of Pod workloads, and thus the accessibility of the service that exposes these Pods.

An example of a CNI plugin used in some embodiments for network implementation is Antrea. Antrea is a performant CNI plugin that includes many features, leverages Open vSwitch (OVS) as the data plane, and efficiently implements Kubernetes NetworkPolicy using conjunctive OpenFlow (i.e., a communications protocol that provides access to the forwarding plane of a network switch or router over a network). In addition to the standard Kubernetes NetworkPolicy, which focuses on expressing a developer's intent to secure their applications, Antrea also offers an extended set of native policy constructs that fit the cluster administrator persona. Antrea-native policies support prioritization of rules, grouping policies with tiers, audit logging, and FQDN-based (fully-qualified-domain-name-based) filtering. Similar to Kubernetes NetworkPolicy, this extended set of administrator policies also operates on Layer 3 (L3) and Layer 4 (L4) only, and as such, networking traffic is either allowed or entirely blocked for a specific host port and protocol combination of a service backend.

In some embodiments, the method is performed by a module executing on the host computer. For instance, the method of some embodiments is performed by a network plugin agent deployed to the host computer. The network plugin agent, in some embodiments, is a network plugin that interfaces with the CNI delegated to implement network services for the container orchestration platform. In some embodiments, the network plugin can define forwarding rules for MFEs (managed forwarding elements), such as OVS, executing on host computers along with containers managed by the container orchestration platform (e.g., Kubernetes).

The network plugin of some embodiments can also define L3/L4 services (e.g., firewall services, load balancing services, etc.). Moreover, in some Kubernetes deployments, Kubernetes NetworkPolicies can be used to define L3/L4 firewall rules, as mentioned above. However, all of these rules are L3/L4 services, and do not include L7 services (e.g., application layer services). Some embodiments provide a novel method for allowing a network administrator to use a traffic control (TC) custom resource (CR) to efficiently specify re-directing and/or mirroring policies in terms of high-level constructs, and having the network plugin convert these TC CR instance constructs into redirecting policies and/or mirroring policies that redirect or mirror flows to the L7 packet processor or processors that perform L7 services.

The method initially receives notification regarding the creation of a TC CR instance that is defined by reference to a TC custom resource definition (CRD). The traffic control CR uses one or more high-level attributes that define a category of data traffic flows that should be directed to a set of one or more L7 packet processor. The method receives the notification from the container orchestration platform in some embodiments. For example, the notification in some embodiments is received from an API server of the container orchestration platform. This API server receives an API (application programming interface) that directs the API server to create the TC CR, and creates the TC CR instance by parsing the API to extract parameters used to define the TC CR.

After receiving the notification regarding the creation of the TC CR, the method then uses the TC CR attributes to generate a set of flow records for a set of one or more managed forwarding elements (MFEs) executing on the host computer to use to direct a set of flows received by the MFE set to the layer 7 packet processor. After generating the set of flow records, the method provides the set of flow records to the set of MFEs to use. For instance, in some embodiments, the set of MFEs includes an OVS (Open Virtual Switch) forwarding element executing on the host computer. In these embodiments, the method provides one or more OVS flow records for the OVS forwarding element to use to identify flows that need to be directed or re-directed to the L7 packet processor (e.g., an L7 firewall).

To generate the flow records, the method identifies a set of interfaces of the MFE set executing on the host computer that are candidate interfaces for receiving flows that need to be directed based on the TC CR instance to a layer 7 packet processor. The identified set of interfaces in some embodiments can include (1) an interface associated with a Pod that executes on the host computer and that is a source of a flow that needs to be directed to the L7 packet processor, and/or (2) an interface associated with a Pod that is a destination of a flow that needs to be directed to the L7 packet processor.

The TC CR instance includes one or more attributes that the method uses to identify source or destination Pods. These might be attributes that specifically identify these Pods, or might be high-level attributes that identify the Pods more generally. For instance, these attributes in some embodiments include labels associated with Pods, or labels associated with namespaces. These attributes can also specify a direction of flows of interest (e.g., in, out, or both). In some embodiments, whether a Pod is a source or destination of a flow is determined based on whether the TC CR instance is specified for ingress flows to the Pod (i.e., direction specified is "in"), egress flows from the Pod (i.e., direction specified is "out"), or both ingress and egress flows associated with the Pod (i.e., direction specified is "both"). The source or destination Pods, in some embodiments, are defined in the TC CR instance using high level attributes, while the set of flow records specifies interfaces of the source or destination Pods in terms of network addresses associated with the source or destination Pods (i.e., lower-level attributes).

In addition to identifying the set of interfaces connected to the source or destination machines (e.g., Pods), the method of some embodiments also identifies the MFE interface associated with the L7 packet processor. For instance, in some embodiments, the TC CR instance has a set of one or more identifier attributes (e.g., name or label attribute) that the method uses to identify the L7 packet processor to use, and the method uses the identifier attribute set to identify an MFE interface associated with the L7 packet processor. The method in some embodiments uses the identified MFE interface associated with the L7 packet processor to define the flow record(s) that it generates for directing or re-directing a set of flows to the L7 packet processor. For instance, some embodiments use an IP (Internet protocol) address assigned to the identified MFE interface for the L7 packet processor as the IP address to which packets matching a flow record in the set of flow records are to be directed. In some embodiments, the L7 packet processor executes on the host computer, while in other embodiments, the L7 packet processor executes outside of the host computer.

Since cloud native applications typically use application protocols such as HTTP (hypertext transfer protocol) or gRPC (Google remote procedure call) to expose their APIs, some embodiments provide means for developers to deploy application-aware Layer 7 (Application Layer or L7) policies that filter requests to their services based on specific application protocol attributes (e.g., HTTP verbs). In some embodiments, a traffic control and processing model for L7 security services is provided with the CNI plugin (e.g., Antrea) by introducing a new API that allows controlling the traffic of a container orchestration network's workloads and leveraging L7 packet processing engines for deep packet inspection (DPI) and policy enforcement.

For example, in some embodiments, the L7 packet processor performs one or more middlebox service operations based on L7 parameters extracted from flows directed to and processed by the L7 packet processor. The L7 parameters are extracted by the L7 packet processor of some embodiments during a DPI operation performed on the flows by the L7 packet processor. Examples of middlebox service operations include firewall operations, load balancing operations, network address translation operations, intrusion detection operations, and intrusion prevention operations, in some embodiments.

In some embodiments, the flow record that the method generates for and provides to the MFE has an action attribute that specifies how the MFE should forward a flow to the L7 packet processor. The method generates this action attribute based on an action attribute that is specified in the TC CR instance in some embodiments. Examples of such actions include (1) "redirect" which directs the MFE to forward a particular flow to the L7 packet processor, and (2) "copy" or "mirror" which directs the MFE to forward a copy of a flow to the L7 packet processor. When a flow's packet is redirected to the L7 packet processor, the MFE would receive the packet again from the L7 packet processor (assuming that the packet is not dropped), and then forward the packet to the destination specified by the packet's source (e.g., the source Pod).

FIG. 1 illustrates a networking solution of some embodiments. The networking solution, in some embodiments, is an Antrea networking solution implemented for a container orchestration network (e.g., Kubernetes). In some embodiments, as a Kubernetes networking solution, Antrea implements the CNI, while Kubernetes NetworkPolicy operates at L3/L4 to provide network connectivity and security services for a Kubernetes cluster (i.e., collection of nodes for running containerized applications), leveraging the benefit of programmable networks from OVS to Kubernetes. OVS is a widely adopted high-performance programmable virtual switch, originating from VMware, Inc., that is designed to enable effective network automation through programmatic extensions. The network solution described herein leverages OVS in its architecture to efficiently implement Pod networking and security features.

In some embodiments, because of the programmable OVS, forwarding functions are opened to programmatic extension and control. Based on this, a flexible IPAM (IP address management) plugin (e.g., Antrea IPAM plugin) overrides and extends the existing flow tables in some embodiments, which are managed by a centralized CRD (e.g., instead of a local store IP management state from the original host-local IPAM plugin). This centralized controller helps to provide the ability of multiple networks on Pod and IPAM per-namespace, according to some embodiments. In some embodiments, in an L3 forwarding table, all traffic destined to a remote Pod is forwarded through the appropriate tunnel, and for the return flow from a remote Pod to a local node, a distinction is drawn between the remote gateway and the local gateway.

As shown, the networking solution 100 includes nodes 105 (e.g., Kubernetes nodes), a user interface (UI) 150 with a plugin 155 (e.g., Antrea plugin), an API server 160 (e.g., Kubernetes API server), a deployment 170 that runs the controller 175 (e.g., Antrea controller), and command-line tool (antctl) 180 (e.g., Antrea command-line tool). In some embodiments, the UI 150, API server 160, deployment 170, and a command-line tool 180 execute together as part of the control plane on a single master node.

To provide a more flexible IPAM (host-local IP address management) that is based on namespace isolation, the deployment 170 of some embodiments runs the controller 175. The controller 175 is used along with corresponding CRDs to manage all of the IP addresses for Pods executing on nodes in the network. As a result, each Pod subnet is associated with a respective namespace such that the IP assigned to a Pod is related to its business, in some embodiments.

Additionally, Pods located under the same namespace are in the same local area network (LAN) in some embodiments, while Pods under different namespaces are isolated on different networks. In some embodiments, a static IP address assigned to a Pod is configured by the annotation filed for the corresponding configuration file. Users (e.g., administrators) of some embodiments are also able to monitor the IP usage from the command-line tool 180 or the UI 150 in order to expand the corresponding IP resource pool in a timely manner when IP resources are exhausted.

In some embodiments, for each container orchestration network cluster that runs Antrea as CNI, Antrea creates a single deployment of an Antrea controller image (e.g., controller 175 of the deployment 170), as well as a daemon set 120 that includes an agent 122 (e.g., an Antrea network plugin agent) and OVS daemon containers 124 on every node 105 of the cluster. The controller 175 serves as the central control plane that listens to resource updates (e.g., Network Policy updates and Antrea-native Policy updates) from the API server 160, computes the desired state for the OVS datapath of each node 105, and distributes the information to each agent 122 that manages workloads affected by the change.

The agent 122 of some embodiments is responsible for managing Pod network interfaces and OVS flows. The agent 122 creates the OVS bridge 140, a veth pair for each Pod (e.g., a veth 135 of a Pod 130 and a veth 142 of the OVS bridge 140), with one end being in the Pod's network namespace and the other connected to the OVS bridge. On the OVS bridge 140, the agent 122 of some embodiments also creates a tunnel port 144 (e.g., antrea-tun0) for creating overlay tunnels to other nodes, and, while not shown, creates an internal port (e.g., antrea-gw0 by default) to be the gateway of the node's subnet. The agent 122 of some embodiments registers for notifications regarding TrafficControl CRs from the API server 160 and translates high-level definitions of attributes from the TrafficControl CRs to lower-level network interface attributes (e.g., IP addresses of source and destination interfaces, L7 packet processor interfaces, etc.), and creates OVS flows (e.g., OpenFlow rules) for redirecting or mirroring certain flows to the L7 packet processor.

The UI 150 is used to manage Kubernetes clusters by translating human-readable commands into API calls that can be understood by the Kubernetes API server 160. In some embodiments, the UI 150 is a VMware Octant UI, and presents its output in a graphical user interface (GUI) for viewing by a user (e.g., administrator). The UI 150 runs locally on the user's workstation, according to some embodiments, and as a result, does not use up resources of the node or nodes that it manages. The UI 150 includes plugin 155 (e.g., Antrea plugin) for receiving CRDs (e.g., Antrea CRDs) from the API server 160.

The controller 175 additionally monitors network policy, pod, and namespace resources with the API server 160. The controller 175, in some embodiments, uses information associated with these resources to compute policy rules, which can be translated to OVS flows efficiently and disseminated to a targeted agent (e.g., agent 122) that runs on a node along with one or more affected Pods. The API server 160 enables different components of the cluster (i.e., a master node and set of one or more worker nodes) to communicate with each other and with components external to the cluster, according to some embodiments. Additionally, in some embodiments, the API server 160 enables users to query and alter the states of API objects, such as Pods, namespaces, configuration maps, and events.

Each of the worker nodes 105 includes a node agent 110 (e.g., a Kubernetes kubelet), CNI 112 (e.g., an Antrea CNI), network proxy 114 (e.g., a Kubernetes kube-proxy), IP tables 116, daemonset 120, one or more Pods 130, and an OVS bridge 140. The node agent 110, in some embodiments, is responsible for registering the node 105 with the API server 160. Additionally, the node agent 110 ensures that containers defined in Pod specifications received from the API server 160 are both running and healthy. In some embodiments, instead of receiving the Pod specifications from the API server 160, the node agent 110 receives the Pod specifications from an HTTP endpoint (not shown) or an HTTP server (not shown).

The daemonset 120 includes two containers to run the agent 122 and the OVS daemons 124, respectively, on every node, as well as an init-container (not shown) that installs the CNI 112 on the node. The CNI 112, in some embodiments, requests IP addresses for Pods instantiated on the node 105, and interacts with the agent 122 to update the IP tables 116 with the assigned IP addresses.

The network proxy 114 runs on the node 105 to maintain network rules on the node to allow network communications to the Pods 130 from sessions within the cluster, as well as sessions outside of the cluster. In some embodiments, the network proxy 114 forwards data traffic for the Pods itself using the IP addresses in the IP tables 116. OVS of some embodiments realizes the data plane on each of the worker nodes 105 at the same time, and in response, the controller 175 implements the control plane of the software-defined network (SDN) for which the networking solution 100 is implemented.

The agent 122 helps to bridge the controller 175 and OVS between the master node (not shown) and each other node 105 by creating the OVS bridge 140 and a veth pair for each Pod 130, with one end 135 of the veth pair being in the pod's network namespace, and the other end 142 connected to the OVS bridge 140. As shown, the agent 122 interacts with the OVS bridge 140 via the OVS daemons 124. In some embodiments, on the OVS bridge 140, the agent 122 also creates an internal port (not shown) by default as the gateway of the node's subnet, and a tunnel port (not shown) for creating overlay tunnels to other nodes 105. For instance, in the Antrea networking solution, "antrea-gw0" is created as an internal port by default as the gateway of the node's subnet, and "antrea-tun0" is created as a tunnel port for creating the overlay tunnels to other nodes. Additional details regarding per-namespace IP address management can be found in U.S. patent application Ser. No. 17/684,160, titled "Per-Namespace IP Address Management Method for Container Networks", and filed Mar. 1, 2022. U.S. patent application Ser. No. 17/684,160 is incorporated herein by reference.

Figure 2:
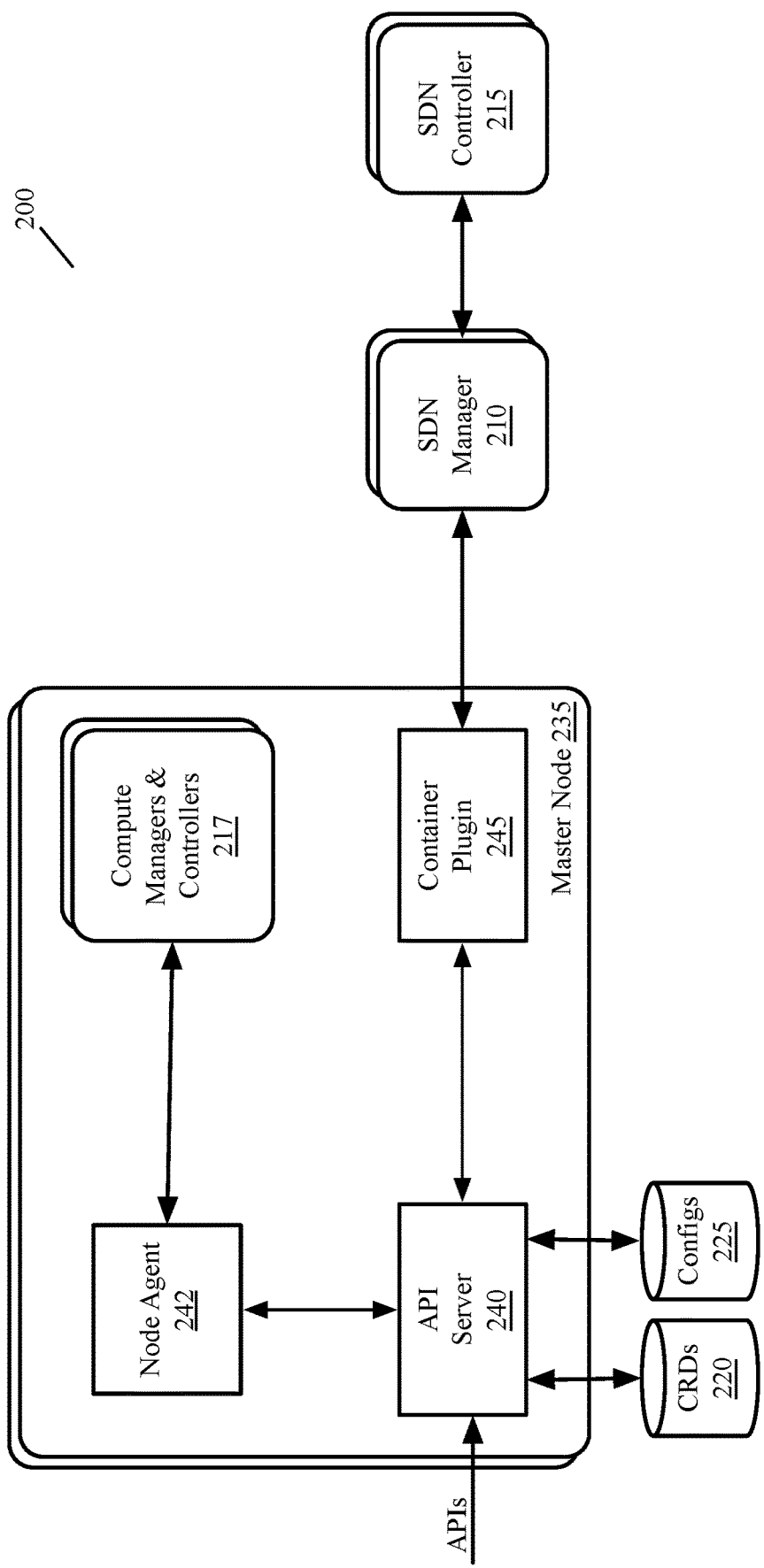
FIG. 2 illustrates an example of a control system of some embodiments of the invention that processes APIs for a container orchestration network.

FIG. 2 illustrates an example of a control system 200 of some embodiments of the invention that processes APIs for a container orchestration network. The control system 200 of some embodiments specifically processes APIs that use the Kubernetes-based declarative model to describe the desired state of (1) the endpoints (e.g., machines) to deploy, and (2) the connectivity, security and service operations that are to be performed for the deployed endpoints (e.g., private and public IP addresses connectivity, load balancing, security policies, etc.).

To process the APIs, the control system 200 uses one or more CRDs to define some of the resources referenced in the APIs. The system 200 performs automated processes to deploy a logical network that connects the deployed endpoints (e.g., machines) and segregates these endpoints from other endpoints in the datacenter set. The endpoints are connected to the deployed logical network of a virtual private cloud (VPC) in some embodiments. In some embodiments, the control system 200 instead processes APIs that reference the CRDs.

As shown, the control system 200 includes two or more master nodes 235 for API processing, an SDN manager cluster 210, and an SDN controller cluster 215. Each of the master nodes 235 for API processing includes an API processing server 240, a node agent 242, compute managers and controllers 217, and a container plugin 245. In some embodiments, the container plugin 245 is a network controller plugin (NCP). The API processing server 240 receives intent-based API calls and parses these calls. The received API calls in some embodiments are in a declarative, hierarchical Kubernetes format, and may contain multiple different requests.

The API processing server 240 parses each received intent-based API request into one or more individual requests. When the requests relate to the deployment of endpoints, the API server provides these requests directly to compute managers and controllers 217, or indirectly provide these requests to the compute managers and controllers 217 through the node agent 242 and/or the container plugin 245 running on the master node 235 (e.g., a Kubernetes master node). The compute managers and controllers 217 then deploy VMs (virtual machines) and/or sets of containers on host computers in the availability zone.

The node agent 242 on a node can register the node with the API server 240 using one of: the hostname; a flag to override the hostname; or specific logic for a cloud provider. The node agent 242 receives sets of containerspecs, YAML (a data serialization language) or JavaScript Object Notation (JSON) formatted objects that each describe a pod. The node agent 242 uses sets of containerspecs to create (e.g., using the compute managers and controllers 217) the sets of containers that are provided by various mechanism elements (e.g., from the API server 240) and ensures that the containers described in those sets of containerspecs are running and healthy.

The API calls can also include requests that require network elements to be deployed. In some embodiments, these requests explicitly identify the network elements to deploy, while in 1580) 14 other embodiments the requests can also implicitly identify these network elements by requesting the deployment of compute constructs (e.g., compute clusters, containers, etc.) for which network elements have to be defined by default. The control system 200 of some embodiments uses the container plugin 245 to identify the network elements that need to be deployed, and to direct the deployment of these network elements.

In some embodiments, the API calls refer to extended resources that are not defined per se by the baseline Kubernetes system. For these references, the API server 240 uses one or more CRDs 220 to interpret the references in the API calls to the extended resources. The CRDs in some embodiments define extensions to the Kubernetes networking requirements (e.g., new resources in a Kubernetes environment). In some embodiments, the CRDs can include network-attachment-definition (NDs), Virtual Network Interfaces (VIF) CRDs, Virtual Network CRDs, Endpoint Group CRDs, security CRDs, Virtual Service Object (VSO) CRDs, and Load Balancer CRDs. As described herein, the CRDs of some embodiments define traffic control. In some embodiments, the CRDs are provided to the API processing server 240 in one stream with the API calls.

The container plugin 245 is the interface between the API server 240 and the SDN manager cluster 210 that manages the network elements that serve as the forwarding elements (e.g., switches, routers, bridges, etc.) and service elements (e.g., firewalls, load balancers, etc.) in an availability zone. The SDN manager cluster 210 directs the SDN controller cluster 215 to configure the network elements to implement the desired forwarding elements and/or service elements (e.g., logical forwarding elements and logical service elements) of one or more logical networks. The SDN controller cluster 215 interacts with local controllers on host computers and edge gateways to configure the network elements in some embodiments.

In some embodiments, the container plugin 245 registers for event notifications with the API server 240, e.g., sets up a long-pull session with the API server to receive all CRUD (Create, Read, Update and Delete) events for various CRDs that are defined for networking. In some embodiments, the API server 240 is a Kubernetes master VM, and the container plugin 245 runs in this VM as a Pod. The container plugin 245 in some embodiments collects realization data from the SDN resources for the CRDs and provides this realization data as it relates to the CRD status. In some embodiments, the container plugin 245 communicates directly with the API server 240 and/or through the node agent 242.

The container plugin 245 in some embodiments processes the parsed API requests relating to NDs, VIFs, virtual networks, load balancers, endpoint groups, security policies, and VSOs, to direct the SDN manager cluster 210 to implement (1) the NDs that designate network segments for use with secondary interfaces of sets of containers, (2) the VIFs needed to connect VMs and sets of containers to forwarding elements on host computers, (3) virtual networks to implement different segments of a logical network of the VPC, (4) load balancers to distribute the traffic load to endpoints, (5) firewalls to implement security and admin policies, and (6) exposed ports to access services provided by a set of endpoints in the VPC to endpoints outside and inside of the VPC. In some embodiments, rather than directing the SDN manager cluster 210 to implement the NDs, VIFs, virtual networks, load balancers, endpoint groups, security policies, and VSOs, the container plugin 245 communicates directly with the SDN controller cluster 215 to direct the SDN controller cluster 215 to implement the NDs, VIFs, virtual networks, load balancers, endpoint groups, security policies, and VSOs.

The API server 240 provides the CRDs 220 that have been defined for these extended network constructs to the container plugin 245 for it to process the APIs that refer to the corresponding network constructs (e.g., network segments). The API server 240 also provides configuration data from the configuration storage 225 to the container plugin 245. The configuration data in some embodiments include parameters that adjust the pre-defined template rules that the container plugin 245 follows to perform its automated processes. In some embodiments, the configuration data includes a configuration map. The configuration map of some embodiments may be generated from one or more directories, files, or literal values. In some embodiments, the configuration map is generated from files in the configuration storage 225, from data received by the API server from the container plugin and/or from data generated by the SDN manager 210. The configuration map in some embodiments includes identifiers of pre-created network segments of the logical network.

The container plugin 245 performs these automated processes to execute the received API requests in order to direct the SDN manager cluster 210 to deploy the network elements for the VPC. For a received API, the control system 200 performs one or more automated processes to identify and deploy one or more network elements that are used to implement the logical network for a VPC. The control system performs these automated processes without an administrator performing any action to direct the identification and deployment of the network elements after an API request is received.

The SDN managers 210 and controllers 215 can be any SDN managers and controllers available today. In some embodiments, these managers and controllers are the NSX-T managers and controllers licensed by VMware, Inc. In such embodiments, the container plugin 245 detects network events by processing the data supplied by its corresponding API server 240, and uses NSX-T APIs to direct the NSX-T manager 210 to deploy and/or modify NSX-T network constructs needed to implement the network state expressed by the API calls. The communication between the container plugin 245 and NSX-T manager 210 is asynchronous, in which the container plugin provides the desired state to NSX-T managers, which then relay the desired state to the NSX-T controllers to compute and disseminate the state asynchronously to the host computer, forwarding elements and service nodes in the availability zone (i.e., to the SDDC (software-defined datacenter) set controlled by the controllers 215).

After receiving the APIs from the container plugin 245, the SDN managers 210 in some embodiments direct the SDN controllers 215 to configure the network elements to implement the network state expressed by the API calls. In some embodiments, the SDN controllers serve as the central control plane (CCP) of the control system 200. An Antrea-NSX-T adapter running on a master node 235, in some embodiments, receives the parsed API requests and other data from the API server 240 (i.e., as opposed to the container plugin receiving the parsed API requests and other data), such as API requests for adding routable subnets for logical networks, and generates API calls to direct the manager and controller clusters 210 and 215 to implement the routable segments.

In some embodiments, by default, intra-node Pod traffic is transmitted from a source Pod to a destination Pod directly via the OVS bridge, while inter-node Pod traffic is transmitted through a tunnel between the two OVS bridges on two nodes. L3 and L4 network policies are enforced when the packets hit corresponding OpenFlow entries installed on OVS tables as they enter or leave the bridge, in some embodiments. To implement L7 security policies, in some embodiments, CNIs use proxying for cluster network traffic, where packets are intercepted and examined to verify if any L7 policy applies. Envoy, for example, is a proxy designed for large microservice mesh architectures in some embodiments.

Certain network virtualization and security platforms (e.g., NSX-T from VMware, Inc.) support distributed L7 firewalls and distributed IDS/IPS. For both features, these network virtualization and security platforms run proprietary L7 engines in the user space that perform DPI and enforce L7 policies on the traffic, according to some embodiments. For example, on both ESX and KVM, NSX-T implements a separate channel to redirect traffic from the kernel data path (e.g., ESX vSwitch in ESX vmkernel, or OVS kernel data path for KVM) to the user space L7 engines. On KVM, the traffic redirection leverages the OVS Openflow packet-in mechanism, which can send matched packets from OVS to the Openflow controller through a Unix Domain socket. However, this approach is not performant, and it requires changes to L7 engines to receive the redirected packets. The NSX ESX implementation builds a proprietary packet redirection channel but has similar limitations.

In some embodiments, Antrea is extended to work with Envoy by redirecting inter-workload traffic towards the proxy. Alternatively, other embodiments take advantage of an L7 packet processing engine that does DPI and takes necessary actions for L7 rule hits, without terminating and re-establishing the connections or interfering with unrelated traffic. An example of an open-source network threat detection engine for L7 packet processing and DPI is Suricata. Suricata is a signature-based security platform that has automatic application layer protocol detection. Controllers can program rulesets by binding actions with L7 attribute matching criteria. Suricata also has a performant multi-threaded nature and comprehensive support for application layer protocols.

Suricata AF_PACKET capture is an efficient way to direct packets to the engine, and it supports the in-line mode mentioned above. This packet capture pattern requires a pair of dedicated interfaces so that any packet received on one interface is automatically sent to another. Two OVS internal ports are created on each node and attached to the same OVS bridge that the Pods are connected to, in some embodiments. By assigning these interfaces to Suricata via a configuration file, Suricata captures traffic from either interface, in some embodiments, and copies the packets from one to the other if they are not dropped by any rule.

Because, by default, Pod traffic is transmitted from source to destination directly, in order to enforce an L7 firewall for specific Pods, a TrafficControl CR that selects the Pods and redirects ingress traffic to one of the above network interfaces to which Suricata is listening is utilized in some embodiments. In addition, some embodiments install extra OpenFlow rules for the traffic that are sent back to the OVS bridge by Suricata after filtering, to prevent the traffic from being redirected again, leading to a loop.

In some embodiments, Suricata uses signatures to match known threats, policy violations, and malicious behavior. A signature consists of three parts, according to some embodiments. The first part is the action, which determines what happens when the signature matches. The second part is the header, which defines the protocol, IP addresses, ports, and direction of the rule. The third part is the rule options, which define the specifics of the rule. In some embodiments, signatures are used to instruct Suricata how to process the traffic. An example of HTTP specific signature is as follows:

drop http $EXTERNAL_NET any->$POD_IP any (content:"/admin"; http_uri; content: "POST"; http_method;sid:1;)

With the above configuration, some embodiments ensure that POST requests from external networks to the URL "/admin" of the specific Pod are not allowed while it is open to an internal network, regardless of the port used. Furthermore, as Pods are considered ephemeral, and users may customize their own security policies via a Layer 7 NetworkPolicy API, in some embodiments, signatures are expected to be updated frequently along with the events of Pods and security policies. A signature synchronizer is added, in some embodiments, for translating the user-configured Layer 7 policies and the Pods they select to IP-based signatures, and reloading Suricata to take effect. In some embodiments, Suricata is used as the L7 packet processing engine and is integrated with Antrea to implement an L7 firewall, as will be further described below.

To provide application layer network security services to Kubernetes workloads with Antrea, some embodiments redirect network traffic entering or leaving containers to an application-aware packet processing engine for security inspection and traffic filtering. In some embodiments, this is used as the foundation to support L7 firewalls and network-based IPS. As the L7 packet processing engine is placed in-line between workloads, or between workloads and an external network, it can proactively block or deny malicious traffic in some embodiments based on security policies. For IDS and network security monitoring (NSM) where no network traffic alternation is required, some embodiments mirror the network traffic to the L7 packet processing engine for out-of-band security inspection.

In order to achieve this workflow, in some embodiments, there are two main modules, traffic control API layer and L7 packet processing engine. The traffic control API layer is responsible for steering specific traffic to the L7 packet processing engine, and the L7 packet processing engine takes care of inspecting the traffic, detecting and stopping potential incidents, according to some embodiments.

In some embodiments, a traffic control API is added using Kubernetes CRD. When an API server receives a traffic control API, the API server uses a traffic control CRD that defines a CR and that is referenced by the traffic control API to create a traffic control CR instance based on the resource defined by the traffic control CRD, according to some embodiments. The traffic control API of some embodiments accepts client requests and controls the container traffic with OpenFlow rules. In some embodiments, the API is generic and thus provides a mechanism to specify the Pods whose traffic should be selected, the direction of the traffic, whether the traffic should be mirrored or redirected, and the network device port to which the packets should be mirrored or redirected.

FIG. 3 illustrates an example of the structure of a traffic control CRD 300 of some embodiments. As shown, the structure of the traffic control CRD 300 includes a specification for the desired behavior of traffic control, a traffic control specification structure, a namespace selector, a Pod selector, the direction of traffic that should be matched (i.e., in, out, or both), the action that should be taken for the matched traffic, and the device to which the matched traffic should be redirected or mirrored.

FIG. 4 illustrates an example of a CR 400 generated based on a CRD of some embodiments. As shown, the CR 400 is a TrafficControl CR named "web-app-firewall-redirection" and declares all ingress traffic (i.e., based on the direction "In") to Pods matching the label "app-web" in all namespaces (i.e., based on the empty namespaceSelector) to be redirected (i.e., based on the specified action "Redirect") to the device "firewall0" (i.e., based on the attribute value for the device key identifying "firewall0") that performs the L7 packet processing (i.e., an L7 packet processor).

The agent (e.g., agent 122) is responsible for realizing the traffic control request in some embodiments. The agent of some embodiments watches (i.e., has registered for notifications of) the TrafficControl CRs from the API server (e.g., API server 160), and upon being notified of a TrafficControl CR, retrieves attributes of the TrafficControl CR in order to process the attributes to generate flow records (e.g., in the form of OpenFlow rules) for managing container traffic.

As described above, TrafficControl CRs of some embodiments include label selectors that identify Pods and namespaces under which Pods are located. Label selectors do not indicate or provide uniqueness (i.e., unlike names and UIDs (unique identifiers)), and as such, multiple objects can be associated with the same label. In some embodiments, label selectors allow network administrators to identify a set of objects, and can be based on multiple requirements (e.g., a set of attributes used to define the label selector). The requirements, in some embodiments, are defined according to a set of one or more key/value pairs. For instance, the Pod label selector specified by the TrafficControl CR 400 described above is defined for key: app; value: web. As also described above, the label selectors of some embodiments are left empty in order to match to all (i.e., all Pods or all namespaces).

When the agent receives a notification from the API server of a TrafficControl CR, the agent of some embodiments executes a set of steps. First, the agent uses the label selectors to identify and filter through Pods running on the same node as the agent. For example, based on the TrafficControl CR 400, the agent would identify and select any and all Pods on the same node as the agent that match the label selector "app: web". Once the matching Pods are identified, the agent translates the selected Pods to OVS ports by identifying the OVS ports associated with the selected Pods, and identifying the IP addresses of the identified OVS ports. The agent uses the identified IP addresses of the OVS ports as match attributes in OpenFlow rules for traffic that should be mirrored or redirected to the L7 packet processor. For instance, when one or more Pods 130 are identified and selected based on the label selectors, the agent 122 translates the selected Pods 130 to their associated OVS ports 142 in some embodiments.

After identifying the IP addresses of the OVS ports for the selected Pods, the agent uses the device attribute specified in the TrafficControl CR to identify the L7 packet processor target device to which flows are to be mirrored or redirected. Based on the identified L7 packet processor, the agent identifies an OVS port associated with the L7 packet processor, and uses the address of the identified OVS port for the L7 packet processor as the target port to which the traffic matching the OpenFlow rules should be mirrored or redirected. On a node 105, for example, the agent 122 identifies the port 146 for the L7 packet processor 190 as the target port for matched traffic.

The agent generates flow records using the identified addresses of the OVS ports for the selected Pods, as well as the direction(s) specified in the TrafficControl CR, as match attributes, the action specified by the TrafficControl CR (i.e., redirect or mirror) as the action to perform on flows matching any of the flow records, and the address of the OVS port for the L7 packet processor as the address to which the matching flows should be redirected or mirrored. The agent then provides the generated flow records to the OVS bridge via the OVS daemons (e.g., the agent 122 provides OpenFlow rules to the OVS bridge 140 via the OVS daemons 124).

FIG. 5 illustrates an example of calculated OpenFlow rules 500 of some embodiments for first and second Pods, Pod-A and Pod-B, having respective OVS ports veth-a and veth-b. As a result of the OpenFlow rules 500, the data plane no longer transmits traffic toward Pod-A and Pod-B to their OVS ports veth-a and veth-b directly, but rather to the "firewall0" device, from which an L7 packet processing engine will capture traffic. After processing by the L7 packet processing engine, if the decision is "PASS", the traffic will be sent back to the OVS bridge and forwarded to its original destination (e.g., Pod-A via veth-a and/or Pod-B via veth-b).

For embodiments where traffic should be processed in in-line mode (e.g., application layer firewall and IPS), the L7 packet processing engine runs on each node to achieve the least latency. For embodiments that only need a copy of the traffic, the engine can either run on each node or anywhere that is network reachable from the nodes. Additionally, the L7 packet processing engine of some embodiments is capable of capturing traffic from a network device. For features where traffic is redirected, the L7 packet processing engine transmits the accepted traffic via another network device to allow the OVS bridge to continue to forward the accepted traffic to its original destination, according to some embodiments.

Figure 6:
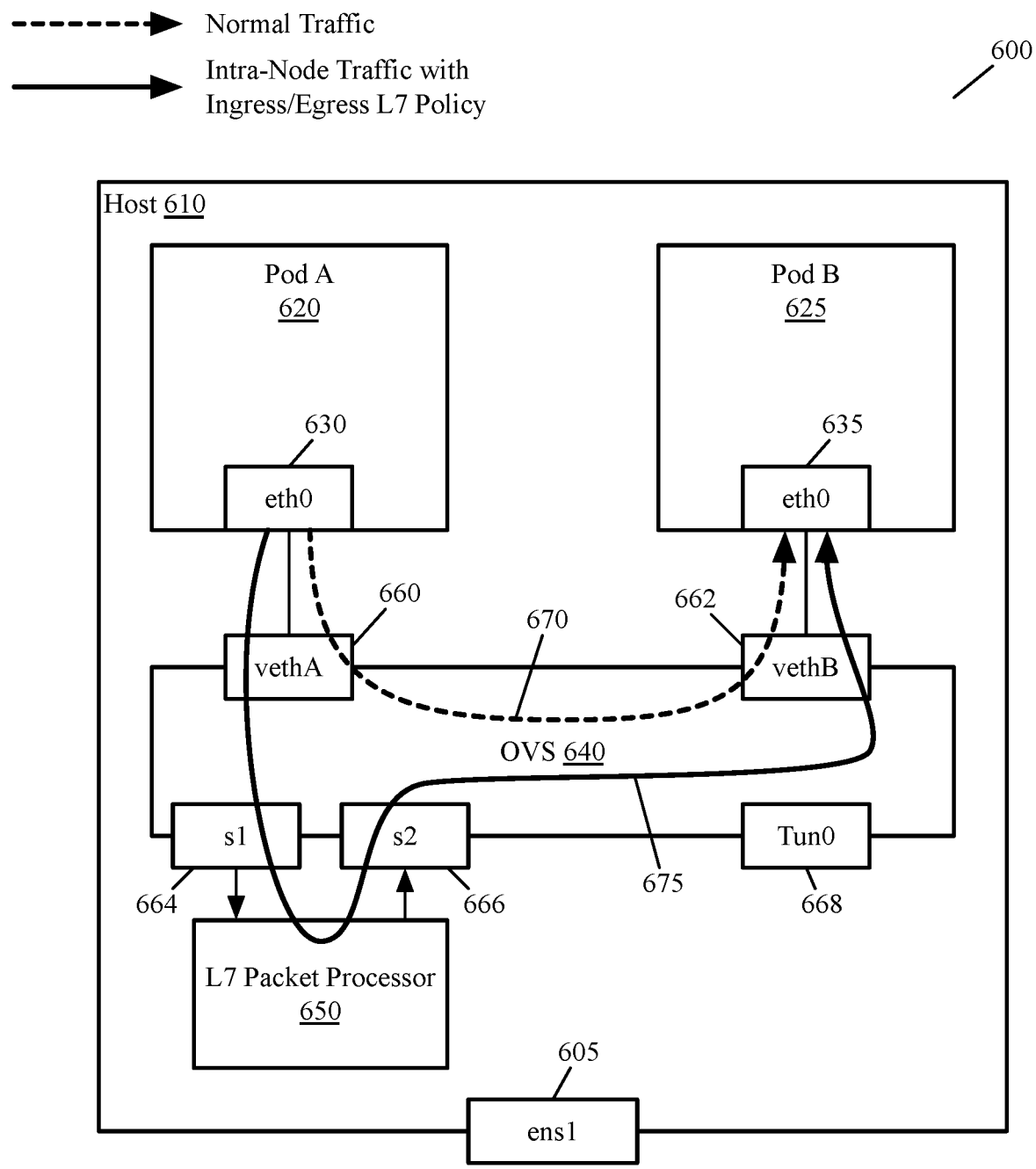
FIG. 6 conceptually illustrates a diagram showing traffic flows between Pods executing on a host that includes an L7 packet processing engine.

FIG. 6 conceptually illustrates a diagram 600 showing traffic flows between Pods executing on a host that includes an L7 packet processing engine. As shown, the host 610 includes Pods 620 and 625, an OVS bridge 640, an L7 packet processing engine 650, and a port 605. The Pod 620 includes a port, eth0, 630 that connects to a port, vethA, 660 of the OVS bridge 640 for exchanging communications with the Pod 620, while the Pod 625 includes a port, eth0, 635 that connects to a port, vethB, 662 of the OVS bridge 640 for exchanging communications with the Pod 625.

The OVS bridge 640 also includes additional ports s1 664, s2 666, and Tun0 668. When traffic is to be processed by the L7 packet processing engine 650, the traffic is forwarded to the port s1 664 for delivery to the L7 packet processing engine 650. After the processing has been performed, the L7 packet processing engine 650 forwards traffic determined to be allowed back to the OVS bridge 640 via the port s2 666. The port Tun0 668 is a tunnel port used to create overlay tunnels to other nodes (not shown).

For intra-node traffic between the Pods 620 and 625 that does not match any defined TrafficControl CRs, the traffic is forwarded along the path 670. For example, when the Pod 620 sends traffic destined for Pod 625, the traffic is forwarded from port 630 of the Pod 620 to the port 660 of the OVS bridge 640, then to the port 662 of the OVS bridge 640, which forwards the traffic to the port 635 of the Pod 625.

Alternatively, for intra-node traffic between Pods 620 and 625 that does match to a defined TrafficControl CR, the traffic is forwarded along the path 675 to the L7 packet processing engine 650 before delivery to its destination. For example, when the Pod 620 sends traffic matching a TrafficControl CR to the Pod 625, the traffic is forwarded from the port 630 of the Pod 620 to the port 660 of the OVS bridge 640. From the port 660, the traffic is then forwarded to port s1 664 for delivery to the L7 packet processing engine 650. When the traffic is allowed after processing by the L7 packet processing engine 650, the L7 packet processing engine 650 forwards the traffic back to the OVS bridge 640 via the port s2 666. The traffic is then passed to the port 662 where it is delivered to the port 635 of the destination Pod 625.

Figure 7:
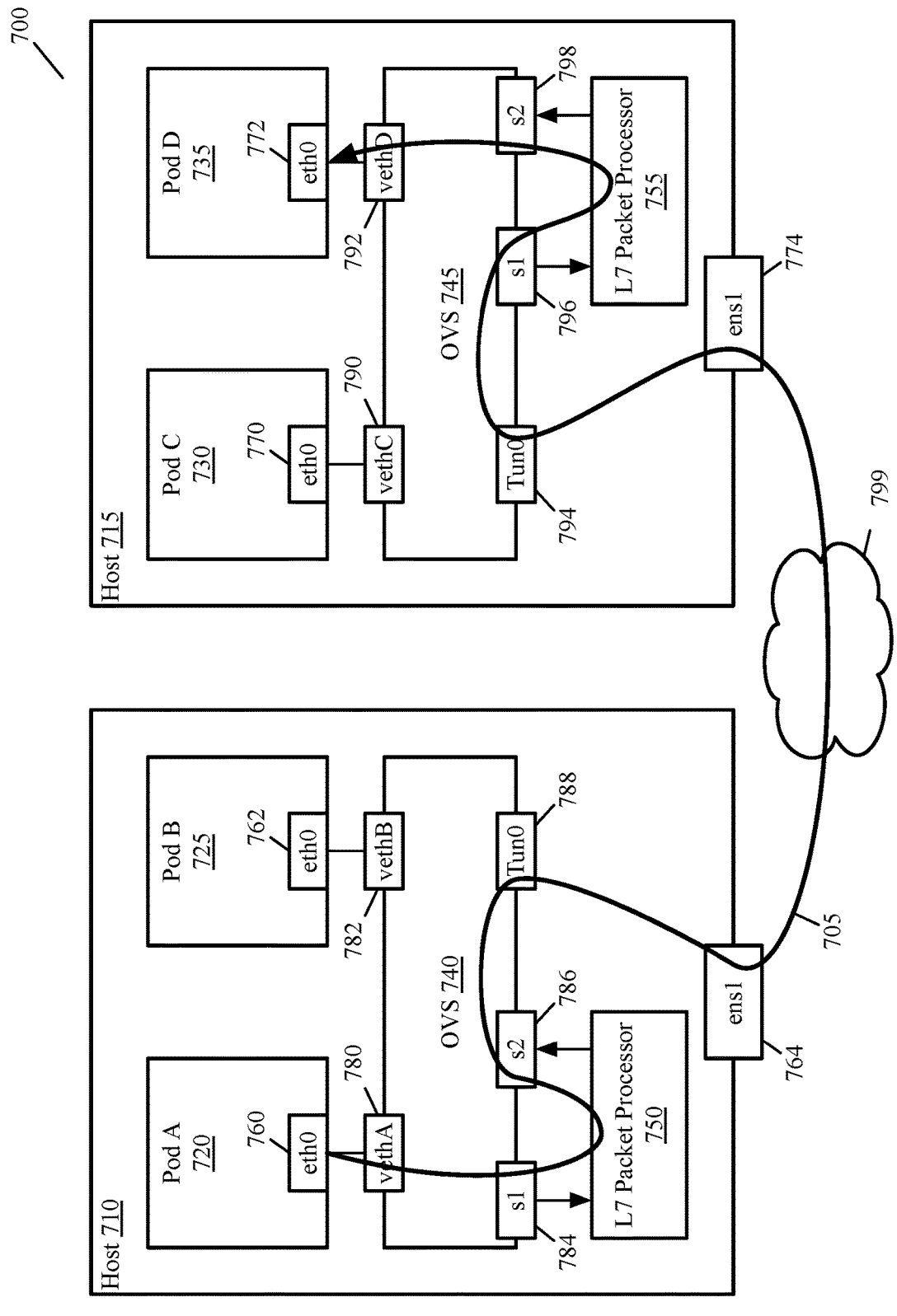
FIG. 7 conceptually illustrates a diagram showing a traffic flow of some embodiments between Pods on different hosts that both include an L7 packet processing engine.

FIG. 7 conceptually illustrates a diagram 700 showing a traffic flow of some embodiments between Pods on different hosts that both include an L7 packet processing engine. The host 710 includes Pods 720 and 725, an OVS bridge 740, an L7 packet processing engine 750, and a port 764. Similarly, the host 715 includes Pods 730 and 735, an OVS bridge 745, an L7 packet processing engine 755, and a port 774. Each of the Pods 720, 725, 730, and 735 includes a respective port 760, 762, 770, and 772.

The ports 760, 762, 770, and 772 of the Pods 720, 725, 730, and 735 are used to connect the Pods to respective ports of the OVS bridges 740 and 745. For example, port 760 of Pod 720 connects to a port, vethA, 780 of the OVS bridge 740; port 762 of Pod 725 connects to a port, vethB, 782 of the OVS bridge 740; port 770 of Pod 730 connects to a port, vethC, 790 of the OVS bridge 745; and port 772 of Pod 735 connects to a port, vethD, 792 of the OVS bridge 745.

Each OVS bridge 740 and 745 also includes ports for sending and receiving traffic to and from the respective L7 packet processing engines 750 and 755 of their respective hosts 710 and 715. The OVS bridge 740 includes a port s1 784 for redirecting or mirroring traffic to the L7 packet processing engine 750, and a port s2 786 for receiving processed traffic determined to be allowed from the L7 packet processing engine 750. The OVS bridge 745 similarly includes a port s1 796 for redirecting or mirroring traffic to the L7 packet processing engine 755, and a port s2 798 for receiving processed traffic determined to be allowed from the L7 packet processing engine 755.

To exchange traffic between Pods executing on different hosts, each OVS bridge 740 and 745 includes a respective tunnel port 788 and 794, as shown. As described above, the tunnel ports of some embodiments are created by agents (not shown) deployed to the hosts and are used to create overlay tunnels to other nodes (e.g., between hosts 710 and 715). When traffic is forwarded between the hosts 710 and 715, the traffic traverses an intervening network fabric 799.

In some embodiments, the hosts 710 and 715 are host machines executing on the same physical host computer (not shown), and the intervening network fabric is a software switch on the host computer for connecting the nodes to each other and to network elements external to the host computer. In other embodiments, the hosts 710 and 715 execute on different physical host computers and the intervening network fabric 799 includes a private network (e.g., an MPLS (multiprotocol label switching) network), or includes one or more public networks, such as the Internet and/or one or more networks of one or more public clouds. In still other embodiments, the intervening network fabric 799 includes a combination of public and private networks (such as those mentioned above). The intervening network fabric 799 of some embodiments includes wired or wireless connections, various network forwarding elements (e.g., switches, routers, etc.), etc.

Inter-Pod traffic flows between Pods on the hosts 710 and 715 that do not match TrafficControl CRs are forwarded without being redirected or mirrored to the L7 packet processing engines 750 and 755. For inter-Pod traffic flows between Pods on the hosts 710 and 715 that do match TrafficControl CRs, the traffic flows are redirected or mirrored to L7 packet processing engines 750 and 755 for processing.

For example, a traffic flow from the Pod 720 on host 710 to Pod 735 on host 715 that matches a TrafficControl CR is forwarded along the path 705, which starts from the port 760 of the Pod 720. The port 760 forwards the traffic to the port 780 of the OVS bridge 740, and from the port 780, the traffic is redirected or mirrored to the port s1 784 of the OVS bridge 740 which is an ingress port for the L7 packet processing engine 750. After the traffic has been processed and allowed by the L7 packet processing engine 750, the L7 packet processing engine 750 forwards the allowed traffic back to the OVS bridge 740 via the port s2 786. Alternatively, traffic that is blocked is dropped and not forwarded to the OVS bridge 740.

From the port 786 of the OVS bridge 740, the traffic is then forwarded to the tunnel port 788, which passes the traffic to the port 764 of the host 710. The port 764 forwards the traffic onto the intervening network fabric 799 to the port 744 of the host 715. In some embodiments, the traffic is processed by forwarding elements (e.g., routers, switches, etc.) as it traverses the intervening network fabric 799. Once the traffic is received at the port 774 of the host 715, the port 774 forwards the traffic to the tunnel port 794 of the OVS bridge 745, which redirects or mirrors the traffic to the port s1 796 when the traffic matches an OVS flow rule generated based on a TrafficControl CR so that the traffic can be processed by the L7 packet processing engine 755.

After the traffic has been processed and allowed by the L7 packet processing engine 755, the L7 packet processing engine 755 forwards the traffic back to the OVS bridge 745 via the port s2 798. Traffic that is determined to be blocked is not forwarded, as also mentioned above. The port 798 forwards the traffic to the port 792 of the OVS bridge 745 which corresponds to the Pod 735. The port 792 then delivers the traffic to the port 772 of the destination Pod 735.

Figure 8:
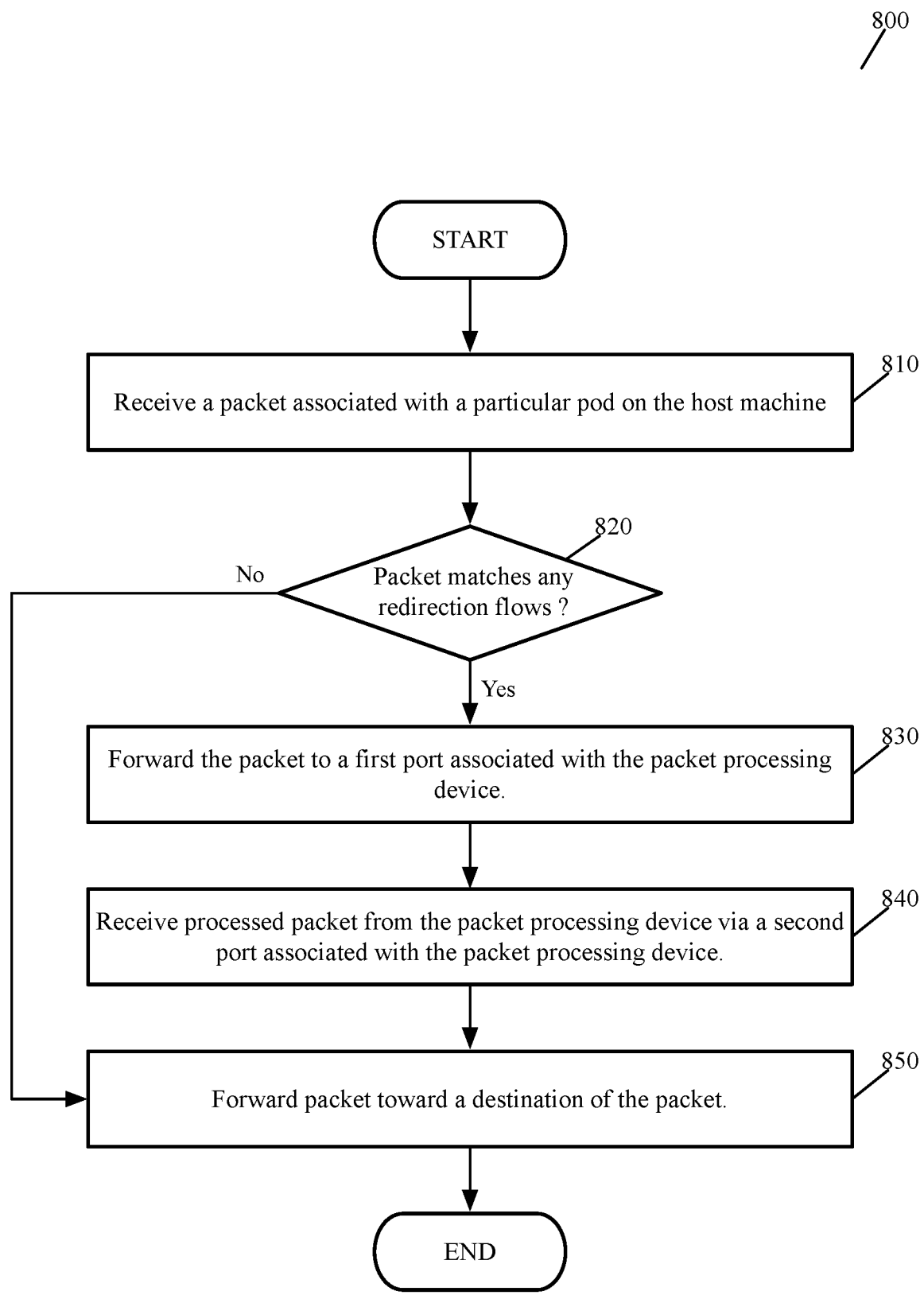
FIG. 8 conceptually illustrates a process performed in some embodiments for performing traffic control using a traffic control CR.

FIG. 8 conceptually illustrates a process performed in some embodiments for performing traffic control using a traffic control CR. The process 800 is performed at an OVS bridge of a host machine, in some embodiments, after an agent has performed the set of steps for a TrafficControl CR (e.g., TrafficControl CR 400) described above in order to install OpenFlow rules. The process 800 will be described with references to FIG. 7.

The process 800 starts when the OVS bridge receives (at 810) a packet associated with a particular Pod on the host machine. For example, the packet of some embodiments can be an ingress packet destined to the particular pod, or an egress packet sent by the particular pod. In some embodiments, the packet is sent from a first Pod on the host machine to a second Pod on the host machine. In other embodiments, the packet is sent from a first Pod on a first host machine to a second Pod on a second host machine.

The process 800 determines (at 820) whether the packet matches any redirection flows created by the network plugin agent (e.g., agent 122). That is, the process 800 determines whether the packet is associated with the pod(s), namespace (s), and flow direction(s) specified by OpenFlow rules installed by a network plugin agent deployed to the host machine. When the packet does not match any redirection flows, the process 800 transitions to 850 to forward the packet toward a destination of the packet. When the packet does match at least one redirection flow, the process 800 forwards (at 830) the packet to a first port associated with the packet processing device.

For example, in the diagram 700, a packet flow sent from the Pod 720 on host 710 to the Pod 735 on host 715 is forwarded from the port 780 that is associated with the Pod 720 to the port s1 784 to be processed by the L7 packet processing engine 750. Similarly, on the destination side at host 715, the packet flow is forwarded to the L7 packet processing engine 755 of the host 715 before the flow is forwarded to the destination Pod 735.

The process 800 receives (at 840) the processed packet from the packet processing device via a second port associated with the packet processing device. That is, when the packet is allowed following processing by the packet processing device, the packet processing device provides the packet back to the OVS bridge for forwarding to its destination either on the same host as where the processing occurred or on a different host. When the packet is blocked following processing by the packet processing device, the packet is dropped, in some embodiments, and not passed back to the OVS bridge.

The process forwards (at 850) the packet toward a destination of the packet. For example, after the L7 packet processing engine 750 processes packets sent by the Pod 720, the L7 packet processing engine 750 passes the packets back to the OVS bridge 740, which forwards the packets via the tunnel port 788 to the port 764 of the host 710 for forwarding to the host 715. On the host 715, after the OVS bridge 745 receives processed packets from the L7 packet processing engine 755 belonging to the flow between Pod 720 and Pod 735, the OVS bridge 745 forwards those packets to the Pod 735 via the port 792 of the OVS bridge 745, as illustrated by path 705. Following 850, the process 800 ends.

Although the above-described embodiments refer to an L7 packet processor as the device that receives directed flows based on the flow records generated from the TC CRs, in other embodiments the TC CR instances are used to generate flow records that direct flows to other types of packet processors, e.g., to L3/L4 middlebox services, to forwarding elements (e.g., switches, routers, gateways, etc.), to third party service appliances, etc.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
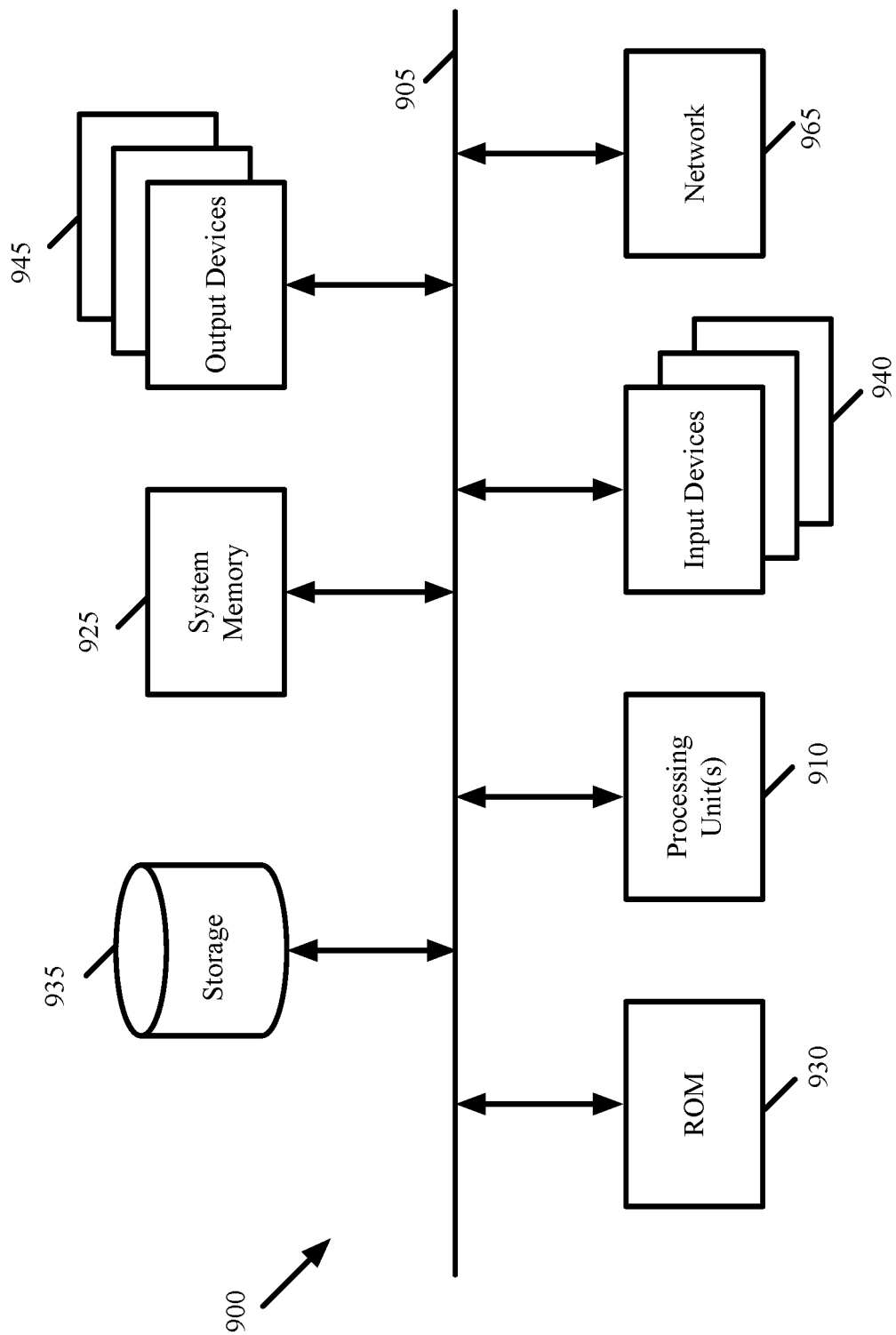
FIG. 9 conceptually illustrates a computer system with which some embodiments of the invention are implemented.

FIG. 9 conceptually illustrates a computer system 900 with which some embodiments of the invention are implemented. The computer system 900 can be used to implement any of the above-described hosts, controllers, gateway, and edge forwarding elements. As such, it can be used to execute any of the above described processes. This computer system 900 includes various types of non-transitory machine-readable media and interfaces for various other types of machine-readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) 910 may be a single processor or a multi-core processor in different embodiments. The read-only-memory (ROM) 930 stores static data and instructions that are needed by the processing unit(s) 910 and other modules of the computer system 900. The permanent storage device 935, on the other hand, is a read-and-write memory device. This device 935 is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory 925 is a volatile read-and-write memory, such as random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices 940 enable the user to communicate information and select commands to the computer system 900. The input devices 940 include alphanumeric keyboards and pointing devices (also called "cursor control devices"). The output devices 945 display images generated by the computer system 900. The output devices 945 include printers and display devices, such as cathode ray tubes (CRT) or liquid crystal displays (LCD). Some embodiments include devices such as touchscreens that function as both input and output devices 940 and 945.

Finally, as shown in FIG. 9, bus 905 also couples computer system 900 to a network 965 through a network adapter (not shown). In this manner, the computer 900 can be a part of a network of computers (such as a local area network ("LAN"), a wide area network ("WAN"), or an Intranet), or a network of networks (such as the Internet). Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of performing layer 7 (L7) packet processing for a set of Pods executing on a host computer, the set of Pods managed by a container orchestration platform, the method comprising:
   at the host computer:
      receiving notification of a creation of a traffic control (TC) custom resource (CR) that is defined by reference to a TC custom resource definition (CRD);
      identifying a set of interfaces of a set of one or more managed forwarding elements (MFEs) executing on the host computer that are candidate interfaces for receiving flows that need to be directed based on the TC CR to a layer 7 packet processor; and
      based on the identified set of interfaces, providing a set of flow records to the set of MFEs to process in order to direct a subset of flows that the set of MFEs receive to the layer 7 packet processor.

2. The method of claim 1, wherein the notification is received from the container orchestration platform, which created the TC CR that references the TC CRD.

3. The method of claim 2, wherein an API server of the container orchestration platform creates the TC CR after receiving an API directing the API server to create the TC CR, and then parsing the API to extract parameters used to define the TC CR.

4. The method of claim 1, wherein the identified set of interfaces comprises an interface associated with a Pod that is a source of a flow that needs to be directed to the L7 packet processor.

5. The method of claim 1, wherein the identified set of interfaces comprises an interface associated with a Pod that is a destination of a flow that needs to be directed to the L7 packet processor.

6. The method of claim 1 further comprising
   from the TC CR, identifying the L7 packet processor;
   identifying an MFE interface associated with the L7 packet processor; and
   using the identified MFE interface associated with the L7 packet processor in the set of flow records.

7. The method of claim 1, wherein the L7 packet processor executes on the host computer.

8. The method of claim 1, wherein the L7 packet processor executes outside of the host computer.

9. The method of claim 1, wherein the L7 packet processor performs a middlebox service operation based on L7 parameters extracted from flows processed by the L7 packet processor.

10. The method of claim 9, wherein the L7 packet processor performs deep packet inspection (DPI) to extract L7 parameters from the flows.

11. The method of claim 10, wherein middlebox service operations comprise at least one of firewall operations, load balancing operations, network address translation operation, intrusion detection operations, intrusion prevention operations.

12. The method of claim 1, wherein the TC CR uses high level attributes to define source or destination Pods associated with the flows that are to be directed to the L7 packet processor, and the set of flow records specifies interfaces of the source or destination Pods in terms of network addresses associated with the source or destination Pods.

13. The method of claim 1 further comprising generating, on the host computer, the flow records by processing attributes specified by the TC CR.

14. The method of claim 1, wherein at least one particular flow is directed to the L7 packet processor by redirecting the particular flow to the L7 packet processor.

15. The method of claim 1, wherein at least one particular flow is directed to the L7 packet processor through a mirroring operation that copies the particular flow and sends the copy to the L7 packet processor.

16. A non-transitory machine readable medium storing a program for execution by a set of processing units of a host computer, the program for performing layer 7 (L7) packet processing for a set of Pods executing on the host computer, the set of Pods managed by a container orchestration platform, the program comprising sets of instructions for:
   receiving notification of a creation of a traffic control (TC) custom resource (CR) that is defined by reference to a TC custom resource definition (CRD);
   identifying a set of interfaces of a set of one or more managed forwarding elements (MFEs) executing on the host computer that are candidate interfaces for receiving flows that need to be directed based on the TC CR to a layer 7 packet processor; and
   based on the identified set of interfaces, providing a set of flow records to the set of MFEs to process in order to direct a subset of flows that the set of MFEs receive to the layer 7 packet processor.

17. The non-transitory machine readable medium of claim 16, wherein:
   the notification is received from the container orchestration platform; and
   an API server of the container orchestration platform creates the TC CR after (i) receiving an API directing the API server to create the TC CR, and then (ii) parsing the API to extract parameters used to define the TC CR.

18. The non-transitory machine readable medium of claim 16, wherein the identified set of interfaces comprises an interface associated with a Pod that is a source of a flow that needs to be directed to the L7 packet processor.

19. The non-transitory machine readable medium of claim 16, wherein the identified set of interfaces comprises an interface associated with a Pod that is a destination of a flow that needs to be directed to the L7 packet processor.

20. The non-transitory machine readable medium of claim 16 further comprising sets of instructions for:
   from the TC CR, identifying the L7 packet processor;
   identifying an MFE interface associated with the L7 packet processor; and
   using the identified MFE interface associated with the L7 packet processor in the set of flow records.

* * * * *